(12) United States Patent
Dine et al.

(10) Patent No.: US 11,127,161 B2
(45) Date of Patent: *Sep. 21, 2021

(54) MULTIPLE USER SIMULTANEOUS LOCALIZATION AND MAPPING (SLAM)

(71) Applicant: Apple Inc., Cupertino, CA (US)

(72) Inventors: Abdelhamid Dine, Santa Clara, CA (US); Kuen-Han Lin, Mountain View, CA (US); Oleg Naroditsky, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/927,237

(22) Filed: Jul. 13, 2020

(65) Prior Publication Data

US 2020/0349735 A1   Nov. 5, 2020

Related U.S. Application Data

(63) Continuation of application No. 16/401,287, filed on May 2, 2019, now Pat. No. 10,748,302.

(51) Int. Cl.
*G06T 19/00* (2011.01)
*G06T 7/73* (2017.01)
*G06T 7/00* (2017.01)

(52) U.S. Cl.
CPC .................. *G06T 7/74* (2017.01); *G06T 7/97* (2017.01); *G06T 19/00* (2013.01); *G06T 2207/20221* (2013.01); *G06T 2219/024* (2013.01)

(58) Field of Classification Search
CPC .. G06T 7/74; G06T 7/97; G06T 19/00; G06T 2207/20221; G06T 2219/024

(Continued)

(56) References Cited

U.S. PATENT DOCUMENTS 9,384,594 B2   7/2016   Maciocci et al.
9,928,656 B2   3/2018   Jiang et al.
(Continued)

FOREIGN PATENT DOCUMENTS

CN   10817733 A    6/2018
CN   108430032 A   8/2018

OTHER PUBLICATIONS

German Patent and Trademark Office, Examination Report (with English translation), German Patent Application No. 102020110662.9, 21 pages, dated Apr. 6, 2021.

(Continued)

*Primary Examiner* — Jin Ge
(74) *Attorney, Agent, or Firm* — Thompson Hine LLP

(57) ABSTRACT

In some implementations, a first electronic device including a first image sensor uses a processor to perform a method. The method involves obtaining a first set of keyframes based on images of a physical environment captured by the first image sensor. The method generates a mapping defining relative locations of keyframes of the first set of keyframes. The method receives a keyframe corresponding to an image of the physical environment captured at a second, different electronic device and localizes the received keyframe to the mapping. The method then receives an anchor from the second electronic device that defines a position of a virtual object relative to the keyframe. The method displays a CGR environment including the virtual object at a location based on the anchor and the mapping.

20 Claims, 29 Drawing Sheets

(58) Field of Classification Search
USPC .......................................................... 345/633
See application file for complete search history.

(56) References Cited

U.S. PATENT DOCUMENTS

| | | | |
|---|---|---|---|
| 10,290,049 B1* | 5/2019 | Xu ..................... | G06Q 30/0627 |
| 10,482,677 B1* | 11/2019 | Iyer ..................... | G06K 9/3241 |
| 2012/0306850 A1 | 12/2012 | Balan et al. | |
| 2014/0267234 A1 | 9/2014 | Hook et al. | |
| 2014/0323148 A1 | 10/2014 | Schmalsteig et al. | |
| 2014/0354685 A1 | 12/2014 | Lazarow et al. | |
| 2015/0193982 A1 | 7/2015 | Mihelich et al. | |
| 2016/0117822 A1 | 4/2016 | Yii et al. | |
| 2016/0179830 A1 | 6/2016 | Schmalsteig et al. | |
| 2018/0285052 A1 | 10/2018 | Eade et al. | |
| 2020/0074715 A1* | 3/2020 | Dixit ..................... | G06F 16/335 |

OTHER PUBLICATIONS

The State Intellectual Property Office of the People's Republic of China, Search Report (with English translation, Chinese Patent Application No. 202010340386.6, 5 pages, dated Apr. 6, 2021.
Shuster, M.J. et al., Multi-Robot 6D Graph SLAM Connecting Decoupled Local Reference Filters, *2015 IEEE/RSJ International Conference on Intelligent Robots and Systems (IROS)*, IEEE, pp. 5093-5100 (2015).
Contreras, L. et al., "Efficient Decentalized Collaborative Mapping for Outdoor Environments," *2018 Secod IEEE International Conference on Robotic Computing (IRC)*, IEEE, pp. 56-63 (2018).

\* cited by examiner

MULTIPLE USER SIMULTANEOUS
LOCALIZATION AND MAPPING (SLAM)

CROSS-REFERENCE TO RELATED
APPLICATIONS

This patent application is a continuation U.S. patent application Ser. No. 16/401,287 filed May 2, 2019, which is incorporated herein in its entirety.

TECHNICAL FIELD

The present disclosure generally relates to computer vision, and in particular, to systems, methods, and devices for performing localization and mapping.

BACKGROUND

Various techniques exist for a single user or a single device to performing simultaneous localization and mapping (SLAM). There exists a need for techniques to allow multiple users to share virtual objects among multiple users performing SLAM in a physical environment.

SUMMARY

Various implementations disclosed herein include devices, systems, and methods that enable sharing of information about the physical environment or virtual objects across different user devices performing multiuser SLAM in the physical environment. In some implementations, each user device contributes to reconstruction of the physical environment that may be used to facilitate a user experience, such as a computer-generated reality (CGR) experience. In some implementations, each user device in the multiuser SLAM creates a local unique reconstruction of the physical environment that includes contributions from each other user's reconstructions of the physical environment. In some implementations, the contributions include information about a virtual object included in one user device's CGR experience to more consistently position the virtual object in the CGR experiences on other user devices.

In some implementations, a decentralized approach to multiuser SLAM is implemented in which a central or master device is not required to coordinate information from the multiple-user devices involved. In some implementations, the user devices involved in the multiuser SLAM each independently performs SLAM relative to its own mapping in its own three dimensional (3D) coordinate space. In some implementations, each user device incorporates the contributions from each other user's reconstructions of the physical environment to provide more consistent reconstruction results or to more efficiently provide the reconstructions among the different user devices included in a multiuser SLAM of a physical environment. In some implementations, the redundant mappings of the physical environment maintained at multiple user electronic devices eliminate the need for a central or master non-user device while also allowing any of the user devices to join or leave the multiuser SLAM.

In some implementations, a first electronic device including a first image sensor uses a processor to perform a method. The method involves obtaining a first set of keyframes based on images of a physical environment captured by the first image sensor. The method generates a mapping defining relative locations of keyframes of the first set of keyframes. In some implementations, the mapping is in a first 3D coordinate system maintained by the first electronic device. For example, the mapping may include the relative 3D positions of the keyframes of the first set (or physical features depicted in those keyframes) relative to one another and the first image sensor in a 3D coordinate system maintained by the first electronic device.

The method further involves receiving and using information about the physical environment or virtual objects that was captured by or used at a second different electronic device. Specifically, the method receives a keyframe corresponding to an image of the physical environment captured at the second different electronic device and localizes the received keyframe its own mapping. For example, the first electronic device's mapping may be revised to add the 3D position of the keyframe that was received from the second electronic device or the physical features depicted in that received keyframe. The revised mapping would thus provide the location of the received keyframe relative to the keyframes already represented in the mapping and to the first image sensor.

The method may further receive an anchor from the second electronic device that defines a position of a virtual object relative to the received keyframe. For example, on the second electronic device, a user may have added a virtual object at a particular location that the second electronic device tracks (e.g., anchors) relative to one or more of its own keyframes, e.g., its location relative to the keyframe that was already received by the first electronic device. The first electronic device receives the anchor and thus has information about the location of the virtual object relative to the previously-received localized keyframe and the location of the virtual object with respect to the first electronic device's own mapping.

Accordingly, the method displays a CGR environment including the virtual object at a location based on the anchor and the mapping. In some implementations, the method displays the CGR environment with the virtual object in a display using the first 3D coordinate system of the first electronic device. The CGR experiences on the first and second electronic devices may be more consistent with one another since the virtual object is located with respect to the same keyframe and that same keyframe is included or otherwise used in each device's respective mapping. A virtual vase placed on a real world table top on the second electronic device may appear to be placed on the table top on the first electronic device too. The incorporation of the same keyframe and anchor into the mappings on both devices may help ensure precise or more consistent positioning of the vase on the table in both CGR experiences.

In some implementations, a method is performed by a first electronic device including a first image sensor and a second electronic device including a second image sensor. The method involves obtaining a first set of one or more keyframes based on images of a physical environment captured by the first image sensor, the first set of keyframes defined in a first coordinate system. In the method, the first electronic device receives a second set of one or more keyframes corresponding to images of the physical environment captured at a second electronic device, the second set of keyframes defined in a second coordinate system different than the first coordinate system. In the method, the first electronic device generates a first mapping defining relative locations of keyframes of the first and second sets of keyframes in the first coordinate system. In the method, the second electronic device receives the first set of keyframes corresponding to images of the physical environment captured at the first electronic device and generates a second mapping defining relative locations of keyframes of the first and second sets of keyframes in the second coordinate system. In some implementations, the method implements concurrent separate mappings (e.g., pose graphs) with different 3D coordinate systems using shared keyframes.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, causes the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
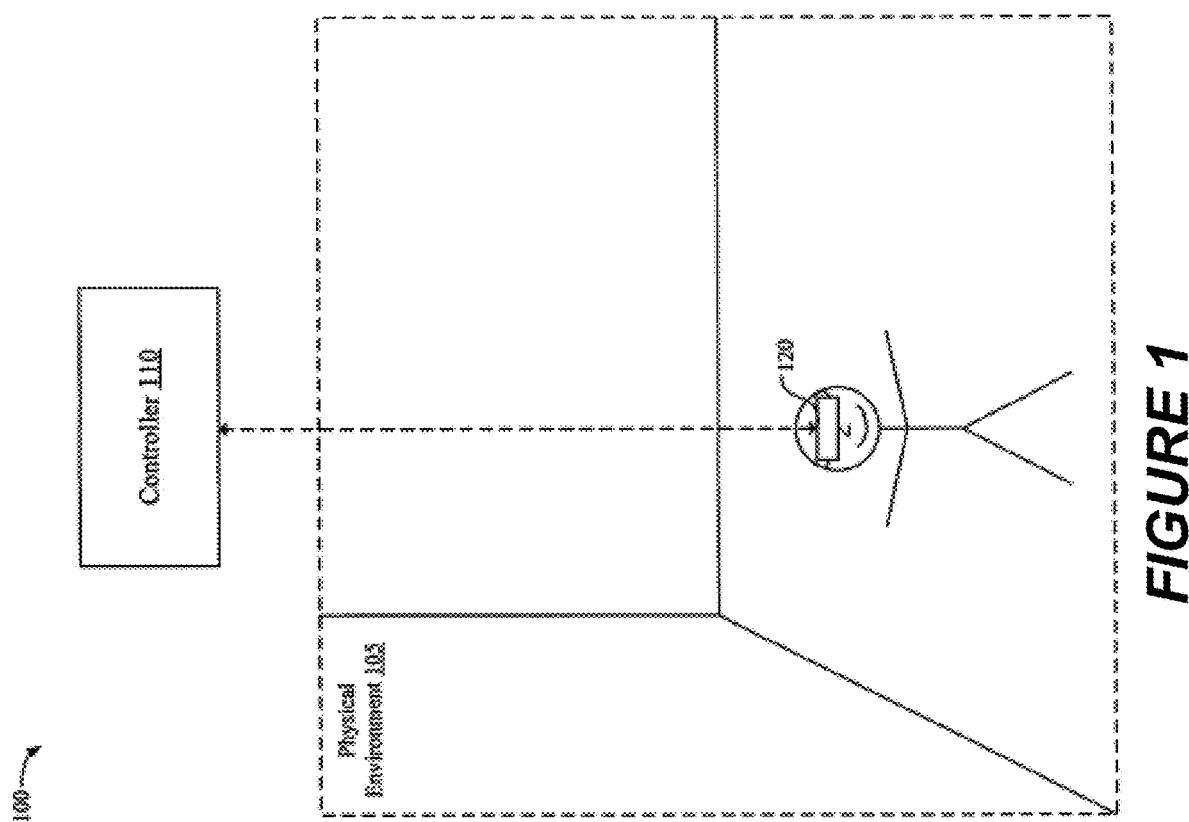
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Figure 2:
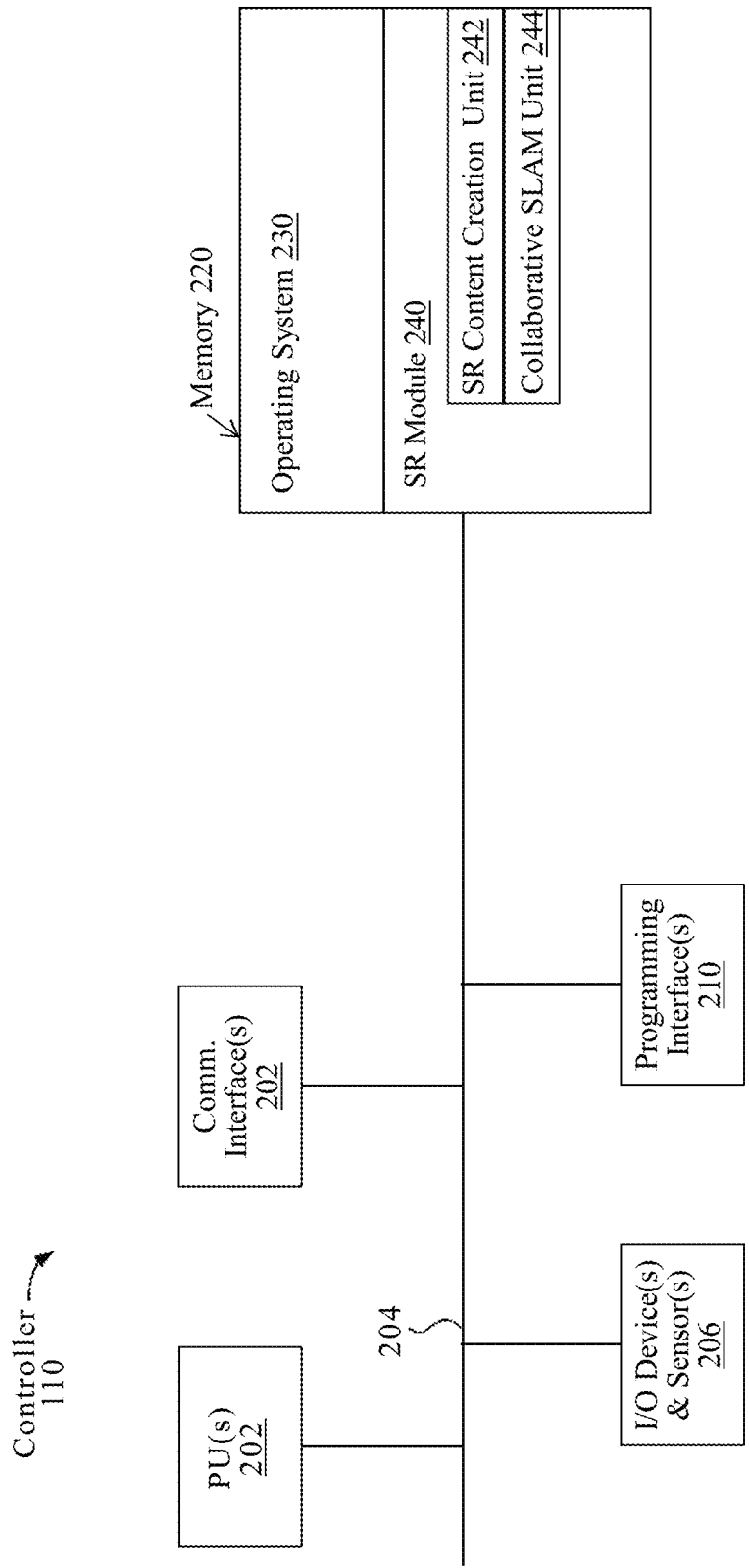
FIG. 2 is a block diagram of an example controller in accordance with some implementations.
Figure 3:
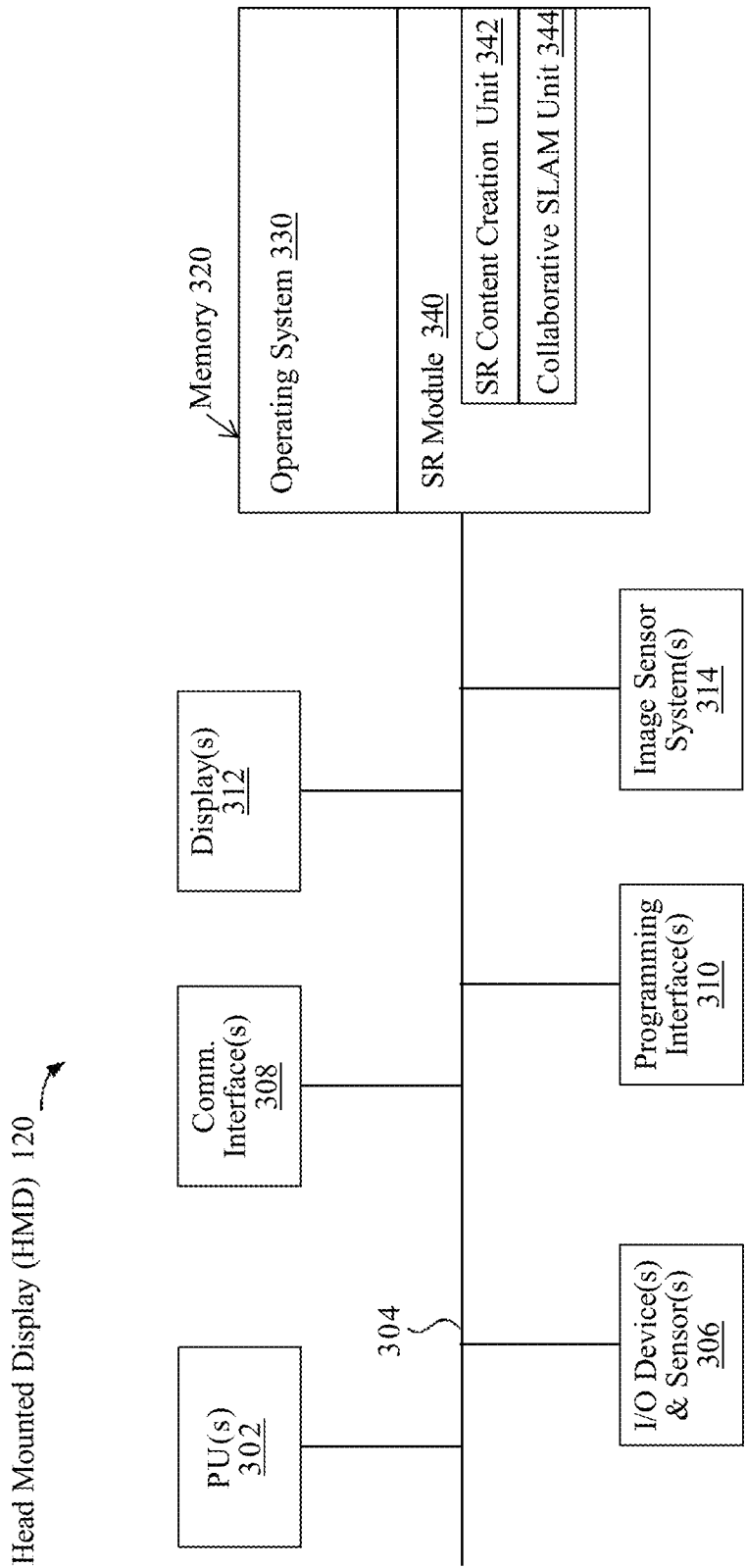
FIG. 3 is a block diagram of an example head-mounted device (HMD) in accordance with some implementations.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. While FIGS. 1-3 depict exemplary implementations involving a head mounted device (HMD), other implementations do not necessarily involve an HMD and may involve other types of devices including, but not limited to, watches and other wearable electronic devices, mobile devices, laptops, desktops, gaming devices, home automation devices, and other devices that include or use image capture devices.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a head-mounted device (HMD) 120, one or both of which may be in a physical environment. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In some implementations, the controller 110 is configured to manage and coordinate a computer-generated reality (CGR) experience for the user. In some implementations, the controller 110 includes a suitable combination of software, firmware, or hardware. The controller 110 is described in greater detail below with respect to FIG. 2. In some implementations, the controller 110 is a computing device that is local or remote relative to the physical environment 105.

In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.).

In some implementations, the controller 110 and the HIVID 120 are configured to present the CGR experience to the user together.

In some implementations, the HMD 120 is configured to present the CGR experience to the user. In some implementations, the HMD 120 includes a suitable combination of software, firmware, or hardware. The HIVID 120 is described in greater detail below with respect to FIG. 3. In some implementations, the functionalities of the controller 110 are provided by or combined with the HIVID 120, for example, in the case of an HIVID that functions as a stand-alone unit.

According to some implementations, the HIVID 120 presents a CGR experience to the user while the user is present within the physical environment 105. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment.

In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (CGRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and computer-generated reality (CGR) module 240.

The operating system 230 includes procedures for handling various basic system services and for performing hardware dependent tasks.

In some implementations, the CGR module 240 is configured to create, edit, or experience CGR experiences. In some implementations, the CGR module 240 includes a 3D content creation unit 242 and a collaborative SLAM unit 244. The 3D content creation unit 242 is configured to create and edit 3D content that will be used as part of CGR experiences for one or more users (e.g., a single CGR experience for one or more users, or multiple CGR experiences for respective groups of one or more users). A content-creation CGR experience may be provided by the CGR module 240 to facilitate the creation of such content. For example, the user may view and otherwise experience a CGR-based user interface that allows the user to select, place, move, and otherwise configure virtual objects in 3D content that is being created or edited, for example, based on providing input via hand gestures, voice commands, input device inputs, etc. A collaborative SLAM unit 244 is configured to facilitate the sharing of virtual objects among users in a multiuser SLAM during such a 3D content creation or editing experience using one or more merging techniques of shared relative information from another user in the multiuser SLAM.

Although these modules and units are shown as residing on a single device (e.g., the controller 110), it should be understood that in other implementations, any combination of these modules and units may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3 is a block diagram of an example of the head-mounted device (HMD) 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present an CGR experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the HMD 120 includes a single display. In another example, the HIVID 120 includes a display for each eye of the user.

The memory 320 includes high-speed random-access memory, such as DRAM, CGRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR module 340.

The operating system 330 includes procedures for handling various basic system services and for performing hardware dependent tasks.

In some implementations, the CGR module 340 is configured to create, edit, or experience CGR experiences. In some implementations, the CGR module 340 includes a 3D content creation unit 342 and a collaborative SLAM unit 344. The 3D content creation unit 342 is configured to create and edit 3D content that will be used as part of CGR experiences for one or more users (e.g., a single CGR experience for one or more users, or multiple CGR experiences for respective groups of one or more users). A content creation CGR experience may be provided by the CGR module 340 to facilitate the creation of such content. For example, the user may view and otherwise experience a CGR-based user interface that allows the user to select, place, move, and otherwise configure virtual objects in a 3D content that is being created or edited, for example, based on providing input via hand gestures, voice commands, input device inputs, etc. A collaborative SLAM unit 344 is configured to facilitate the sharing of virtual objects among users in a multiuser SLAM during a 3D content creation or editing experience using one or more merging techniques of shared relative information from another user in the multiuser SLAM. Although these modules and units are shown as residing on a single device (e.g., the HIVID 120), it should be understood that in other implementations, any combination of these modules and units may be located in separate computing devices.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 4A:
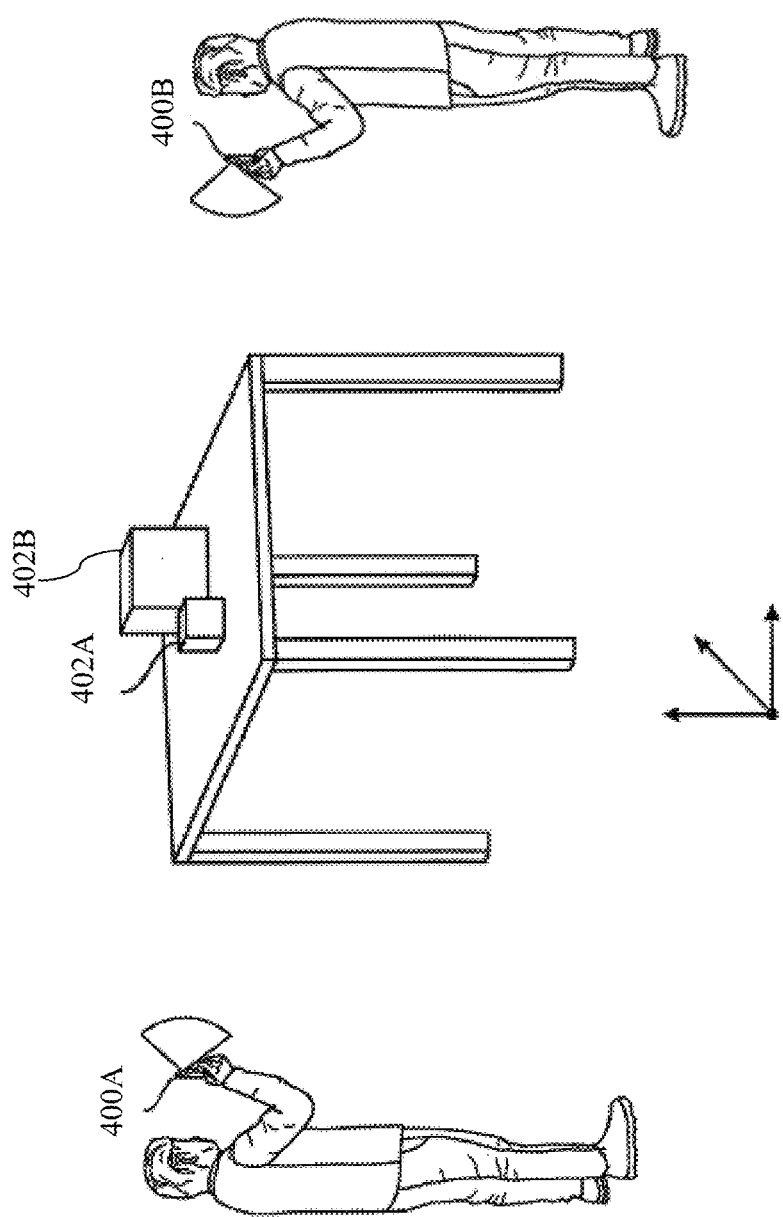
FIGS. 4A-4D are diagrams of an electronic devices using multiuser SLAM techniques in accordance with some implementations.

FIG. 4A illustrates an electronic device 400A and an electronic device 400B. The electronic device 400A or the electronic device 400B can include some or all of the features of one or both of the controller 110 and the HIVID 120.

At FIG. 4A, the electronic device 400A and the electronic device 400B provide a multiuser CGR experience. The electronic device 400A and the electronic device 400B display images of the physical environment captured by the image sensors of the respective devices (e.g., image sensor(s)). In addition to displaying images of physical objects such as cubes 402A and 402B, the electronic device 400A and the electronic device 400B display virtual objects so that the virtual objects appear to exist in the physical environment, thereby augmenting the users' views of the physical environment. However, to display or share virtual objects (or augment the physical environment in some other manner (e.g., changing the apparent color of a physical object)), it is advantageous for the electronic device 400A and the electronic device 400B to consistently determine mappings of the physical environment or their own relative image sensor poses (e.g., positions and orientations).

In accordance with some implementations, techniques for determining more consistent mappings of the physical environment or estimates of the electronic device poses are described below with respect to FIGS. 4B-4D.

Figure 4B:
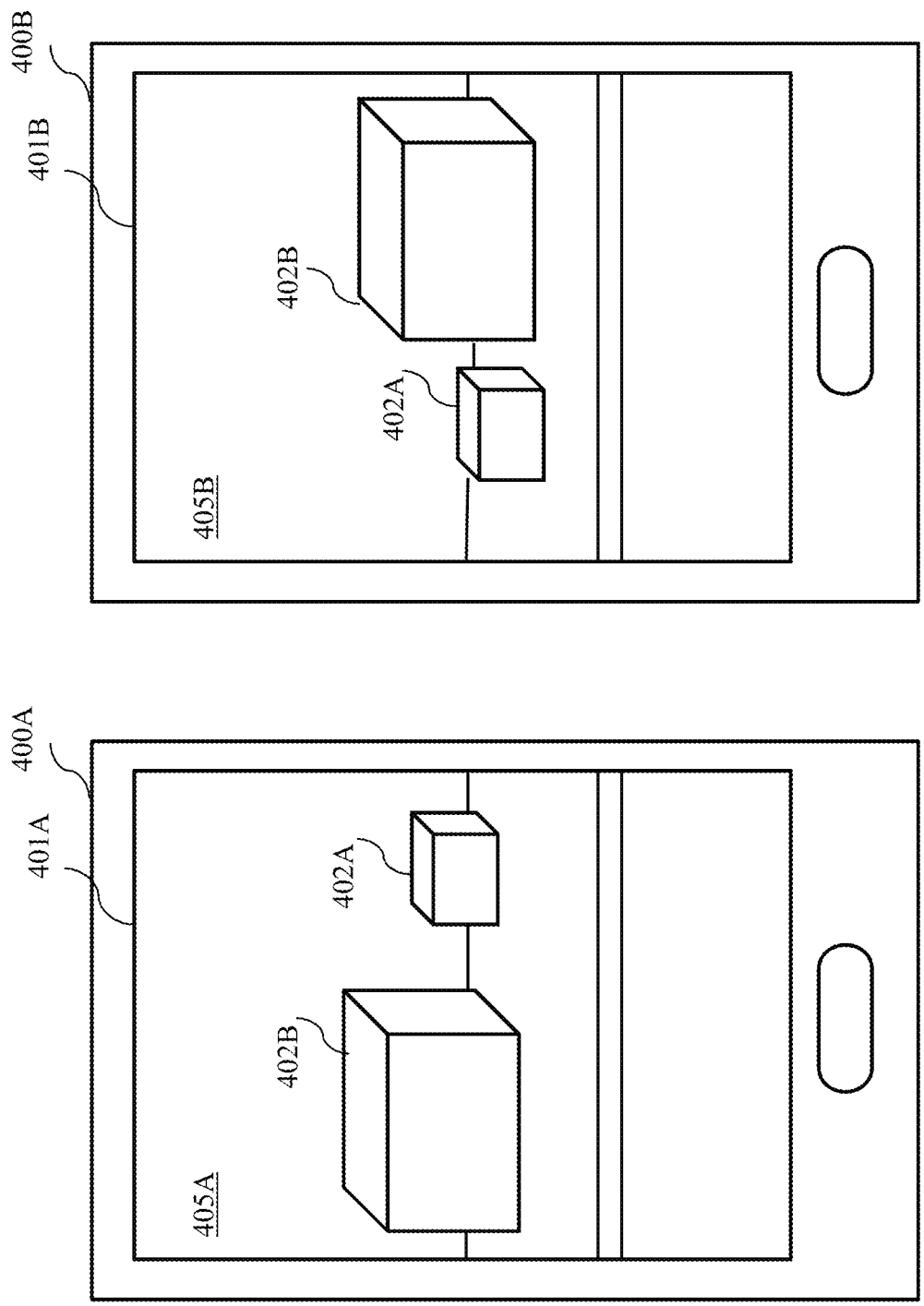
Figure 4C:
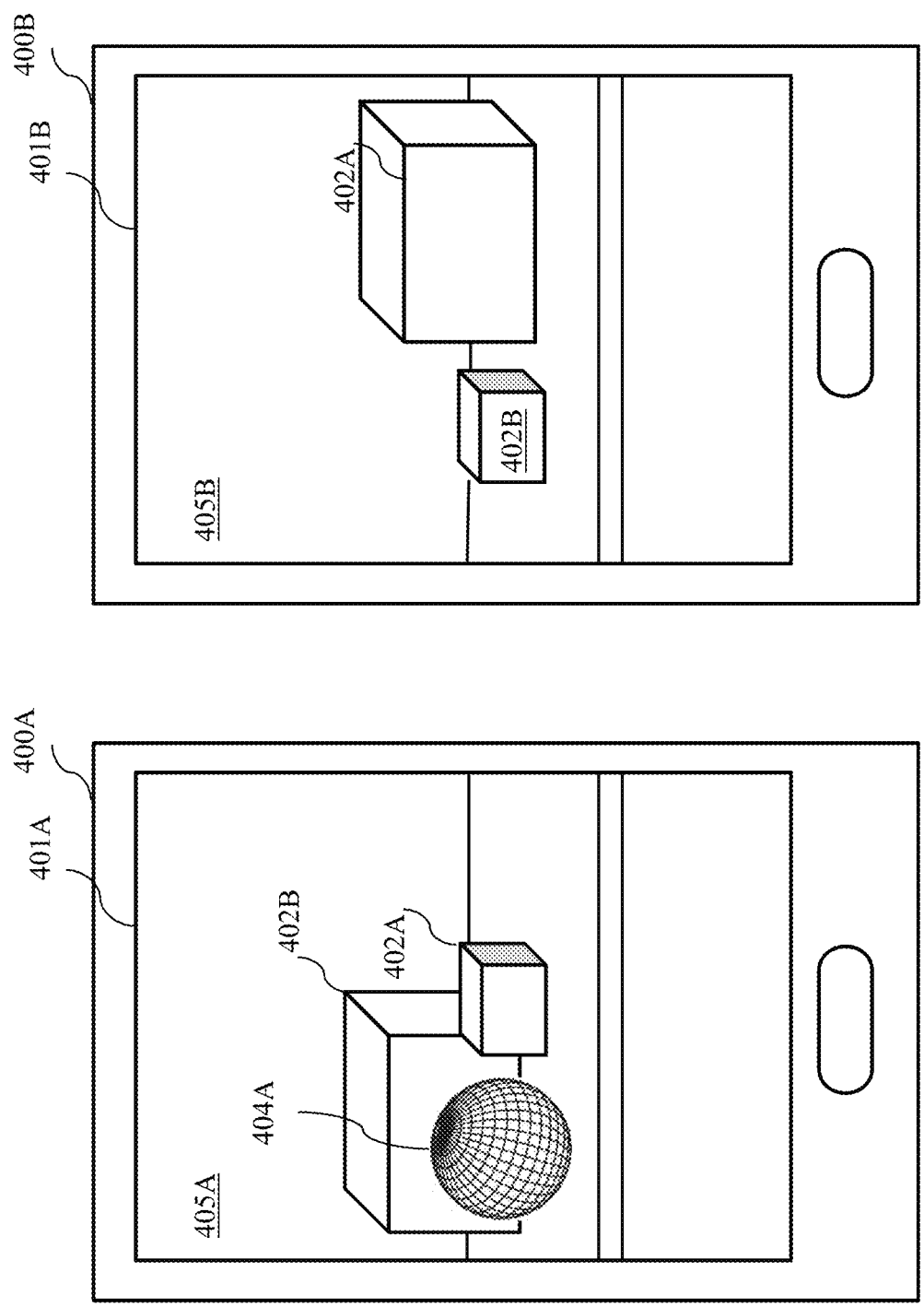

At FIG. 4B, the electronic device 400A initiates a process for mapping and localizing device 400A with respect to the physical environment using, for example, a SLAM technique. The electronic device 400A captures images of cubes 402A and 402B via the image sensor (e.g., image sensor(s)) located on the electronic device 400A. The electronic device 400A displays these captured images via CGR experience 405A on display 401A. In some implementations, to determine its pose with respect to the physical environment, the electronic device 400A uses the captured images in combination with data obtained via additional sensor(s) (e.g., motion sensors, depth sensors, orientation sensors, etc.) and corresponding sensor parameters. In some implementations, the electronic device 400A detects notable features from the captured images (e.g., lines, segments, planes, points, or other 3D geometric elements and shapes such as edges or corners of cubes 402A and 402B that are in the field of view of the image sensor) and estimates their positions in 3D space while also estimating its own pose by iteratively reducing or minimizing an error function for the 3D position and pose estimations using the captured images and data obtained via the image sensor and additional sensors. The electronic device 400A may create and store a keyframe that includes an image, positions of features in the image, or the image sensor pose associated with the image. As shown FIG. 4C, the electronic device 400A is moved to a different position in the physical environment during the localization and mapping process. With cubes 402A and 402B still in the field of view of the image sensor, the electronic device 400A captures images of cubes 402A and 402B from a different viewing angle. The electronic device 400A displays these captured images via CGR experience 405A on display 401A. The electronic device 400A detects at least some of the features that were detected at FIG. 4B. By comparing the positions of the features in the captured images or incorporating data from additional sensor(s), the electronic device 400A updates its estimates for the 3D position of the features (e.g., position of a point in 3D space) and its own estimated pose with respect to the physical environment. The electronic device 400A may create and store keyframes that each include an image, positions of features depicted in the image, or the image sensor pose associated with the image. The features of such keyframes, image sensor pose information, and information from other sources (e.g., device motion detection data) can be used to determine a mapping the provides the relative positions of the keyframes to one another in a 3D coordinate space. In some implementations, the electronic device 400A performs SLAM by simultaneously determining its current pose (e.g., localization) and determining relative keyframe locations (e.g., mapping).

In some implementations, upon successful localization and mapping, the electronic device 400A is able to display virtual content at an appropriate place in a CGR experience. In one example, the electronic device 400A uses the determined pose of the image sensor with respect to the physical environment to determine where to display a virtual object 404A. In some implementations, after successful localization and mapping, the electronic device 400A displays virtual object 404A using the pose estimate to position the virtual object 404A in the CGR experience 405A on display 401A. In another example, the electronic device 400A anchors a virtual object 404A to a keyframe feature location and positions the virtual object accordingly in a view of the CGR experience that is generated.

In some implementations, after successfully performing localization and mapping, the electronic device 400A receives from the electronic device 400B captured images and the estimated pose of the electronic device 400B at which the images were captured. In some implementations, after successfully performing localization and mapping, the electronic device 400A receives data from additional sensors and corresponding sensor parameters of the electronic device 400B. Using the captured images and their corresponding poses of the electronic device 400B (and, optionally, the additional data), the electronic device 400A performs reconstruction by performing a similar mapping function to estimate position data for notable features (e.g., a set of 3D points, lines, segments, planes, and/or other 3D geometric elements and shapes) in the captured images. For example, the position data includes Cartesian coordinates for the corners of cubes 402A and 402B that were captured by the images. In some implementations, the electronic device 400A receives a keyframe associated with an image captured at the electronic device 400B. The received keyframe may include the image, positions of features in the image, or the electronic device 400B's image sensor pose. In some implementations, the electronic device 400A receives information from the electronic device 400B using a network protocol, layer, or service. In some implementations, the electronic device 400A receives information from the electronic device 400B only after the electronic device 400B has itself successfully performed localization and mapping.

In some implementations, the electronic device 400A then attempts local registration by comparing the reconstruction of the physical scene using the information received from the electronic device 400B to the CGR experience 405A. In some implementations, the electronic device 400A performs localization between the reconstruction of the physical scene using the information received from the electronic device 400B and the CGR experience 405A. In some implementations at the electronic device 400A, the localization a relative transformation between a plurality of the notable features in the reconstruction of the physical scene using the information received from the electronic device 400B and the CGR experience 405A. Once the electronic device 400A matches the reconstruction of the physical scene using the information received from the electronic device 400B to the CGR experience 405A, the electronic device 400A uses the relative transformation to add (e.g., merge) the information received from the electronic device 400B into the CGR experience 405A on the display 401A. In some implementations, the electronic device 400A updates its own estimated pose with respect to the CGR experience after adding the information received from the electronic device 400B to the CGR experience 405A. In some implementations, the electronic device 400A determines the relative location of a received keyframe to keyframes already included in its own mapping by matching common features found amongst the keyframes. In some implementations, the electronic device 400A alters its own mapping/pose graph to include a received keyframe.

In some implementations, after the electronic device 400A locally registers the reconstruction of the physical scene using the information received from the electronic device 400B to the CGR experience 405A, subsequent information received from the electronic device 400B can be directly added to the CGR experience 405A at the electronic device 400A. In some implementations, the subsequent information received from the electronic device 400B can be directly added to the CGR experience 405A at the electronic device 400A using the locally-determined relative transformation. In some implementations, the subsequent information received from the electronic device 400B can be directly added to the CGR experience 405A at the electronic device 400A using the previously-added information received from the electronic device 400B already in the CGR experience 405A.

In some implementations, the information received from the electronic device 400B at the electronic device 400A includes a representation of one or more features in a three-dimensional space (e.g., physical environment) obtained by or using information obtained by the second electronic device. In some examples, the representation of the one or more features are keyframes or Cartesian coordinates of one or more features in a physical environment (e.g., corners of cubes 202A and 202B that are in the field of view of the image sensor). In some examples, features include points, lines, segments, planes, and/or other 3D geometric elements and shapes. In some examples, the representation of one or more features corresponds to physical objects (e.g., 202A, 202B) in a physical environment (e.g., the representation of one or more features includes positions in space of certain features of the physical objects). In some implementations, the information received from the electronic device 400B at the electronic device 400A includes image or additional sensor parameters, map registration data, virtual object information, or locally determined relative transformations between a CGR experience 405B at the electronic device 400B and information received at the electronic device 400B from other electronic devices in the multiuser SLAM.

Returning to FIG. 4B, the electronic device 400B may also initiate a process for mapping and localizing device 400B with respect to the physical environment using, for example, a simultaneous localization and mapping (SLAM) technique. The electronic device 400B captures images of cubes 402A and 402B via the image sensor (e.g., image sensor(s)) located on the back of the device. The electronic device 400B displays these captured images via display 401B. In some implementations, to determine its pose with respect to the physical environment, the electronic device 400B uses the captured images in combination with data obtained via additional sensor(s) (e.g., motion sensors, depth sensors, orientation sensors, etc.) and corresponding sensor parameters. In some implementations, the electronic device 400B detects notable features from the captured images (e.g., lines, segments, planes, points, and/or other 3D geometric elements and shapes) (e.g., edges or corners of cubes 402A and 402B that are in the field of view of the image sensor) and estimates their position in 3D space while also estimating its own pose by iteratively reducing or minimizing an error function for the 3D position and pose estimations using the captured images and data obtained via image and additional sensors. The electronic device 400B can update the 3D position and pose estimations across additional captured images and additional data obtained via additional sensors as the electronic device 400B is moved. In some implementations, upon successful localization and mapping, the electronic device 400B is able to provide a CGR experience on a display as the electronic device 400B can use the determined pose with respect to the physical environment. Thus, after successful localization and mapping, the electronic device 400B displays a CGR experience 405B on display 401B using the pose estimate.

As described above for the electronic device 400A, after successfully performing localization and mapping, the electronic device 400B receives from the electronic device 400A information such as captured images and the estimated pose of the electronic device 400A at which the images were captured via the network protocol, layer, or service. As described above for the electronic device 400A, after the electronic device 400B locally registers the reconstruction of the physical scene using the information received from the electronic device 400A to the CGR experience 405B, the electronic device 400B uses the relative transformation to add (e.g., merge) the information received from the electronic device 400A into the CGR experience 405B on the display 401B.

Figure 4D:
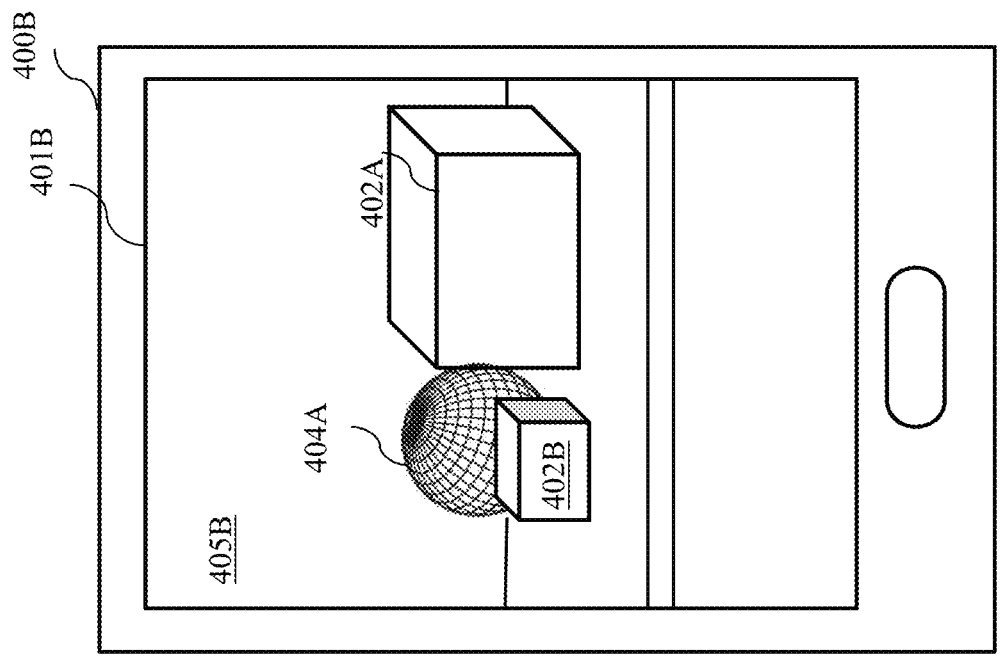

As shown in FIG. 4D, the electronic device 400B consistently displays the virtual object 404A after locally registering the reconstruction of the physical scene using the information received from the electronic device 400A to the CGR experience 405B. As described above for the electronic device 400A, after the electronic device 400B locally registers the reconstruction of the physical scene using the information received from the electronic device 400A to the CGR experience 405B, subsequent information received from the electronic device 400A can be directly added to the CGR experience 405B at the electronic device 400B. In some implementations, the electronic device 400B and the electronic device 400A exchange the same types of information.

Figure 5A:
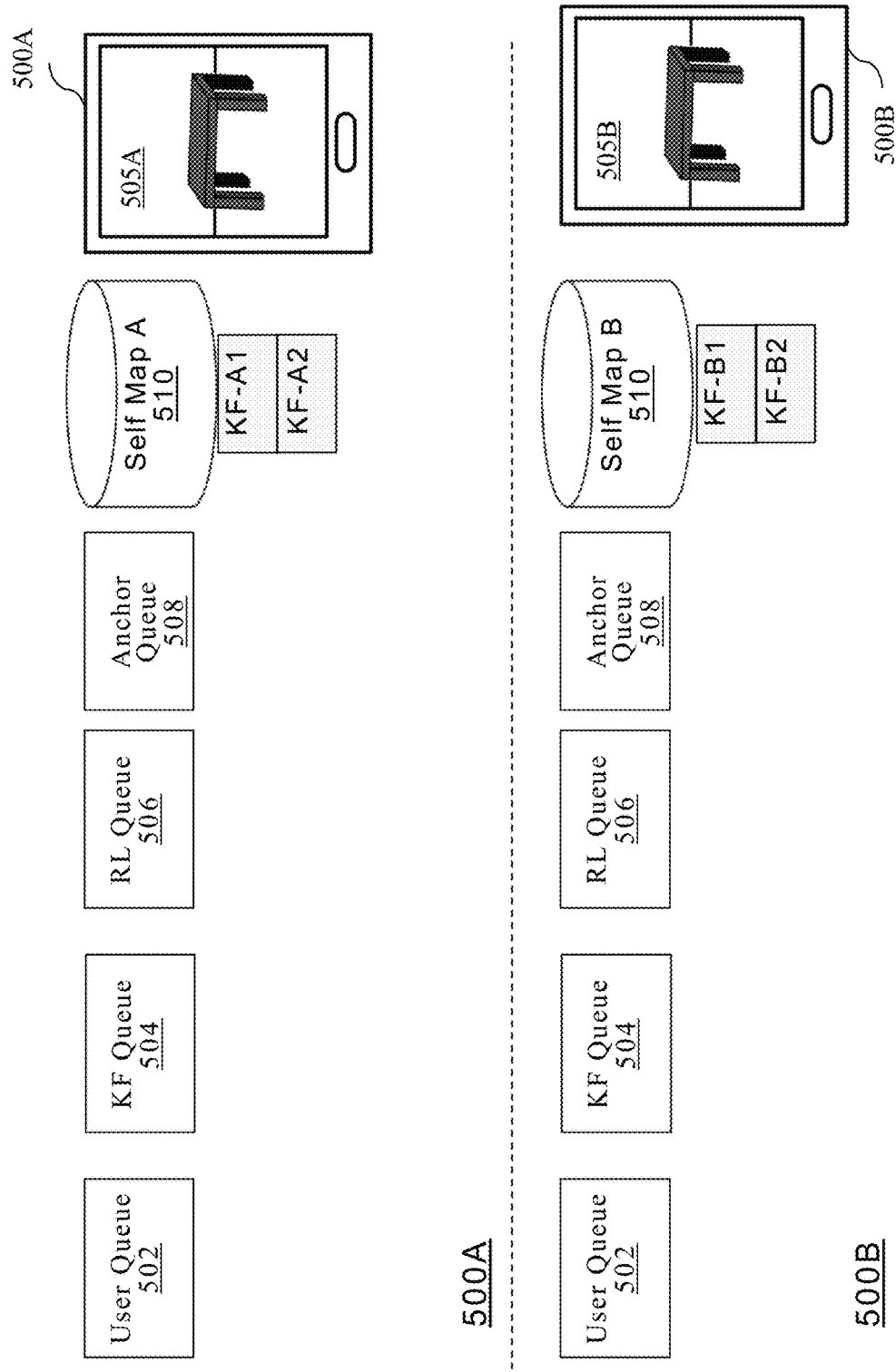
FIGS. 5A-5U are diagrams that illustrate example scenarios and techniques allowing multiple users that each perform localization and mapping of a physical environment to share virtual objects in accordance with some implementations.

In accordance with some implementations, techniques for sharing virtual objects among the electronic device in a multiuser SLAM will now be described. FIGS. 5A-5U are diagrams that illustrate an example scenario where multiple users that each perform SLAM of a physical environment share virtual objects.

In various implementations, two users each begin an individual CGR experience (e.g., localization and mapping) in a shared physical environment. As shown in FIG. 5A, electronic device 500A starts and upon successful localization and mapping, the electronic device 500A (e.g., a first user) has two keyframes KF_A1 and KF_A2. The electronic device 500A displays these captured images via CGR experience 505A. Similarly, electronic device 500B starts and upon successful localization and mapping, the electronic device 500B (e.g., a second user) has two keyframes KF_B1 and KF_B2. The electronic device 500B displays these captured images via CGR experience 505B. As shown in FIG. 5A, keyframes KF_A1, KF_A2, KF_B1, and KF_B2 are highlighted.

In some implementations, keyframes are a subset of all the image sensor frames of data generated by the image sensor (e.g., RGB camera, RGB-D camera (e.g., within a CGR episode). In some implementations, each keyframe, like all frames of camera data, include aligned image (e.g., RGB color) information and additional sensor information (e.g., depth information) associated with a camera pose (e.g., position and orientation in space) at a known time. In various implementations, keyframes are selected using techniques that satisfy keyframes' representation of the CGR experience of the physical environment. In various implementations, keyframes can be identified (e.g., selected among multiple frames) based on motion of the camera. When there is sufficient movement (e.g., a 3D spatial distance over a threshold) or enough movement between current camera frame or viewpoint and a nearby keyframe (e.g., the immediately preceding keyframe), a new keyframe is created or initiated. In alternative implementations, keyframe initiation could be based on other characteristics of the camera such as time, speed of movement, etc. or the physical environment. Each keyframe can be stored in memory and include RGB information (e.g., frame of pixel data), depth information (e.g., frame of depth information) and pose (e.g., orientation and 3D position in a 3D coordinate system).

A historical record can be made of the relative image sensor (e.g., electronic device) movement, which is called a pose graph. In some implementations, keyframes are assigned or positioned along the pose graph and a current camera position can be highlighted. In accordance with some implementations, the pose graph is shown within a global point cloud of a current viewing episode.

Figure 5B:
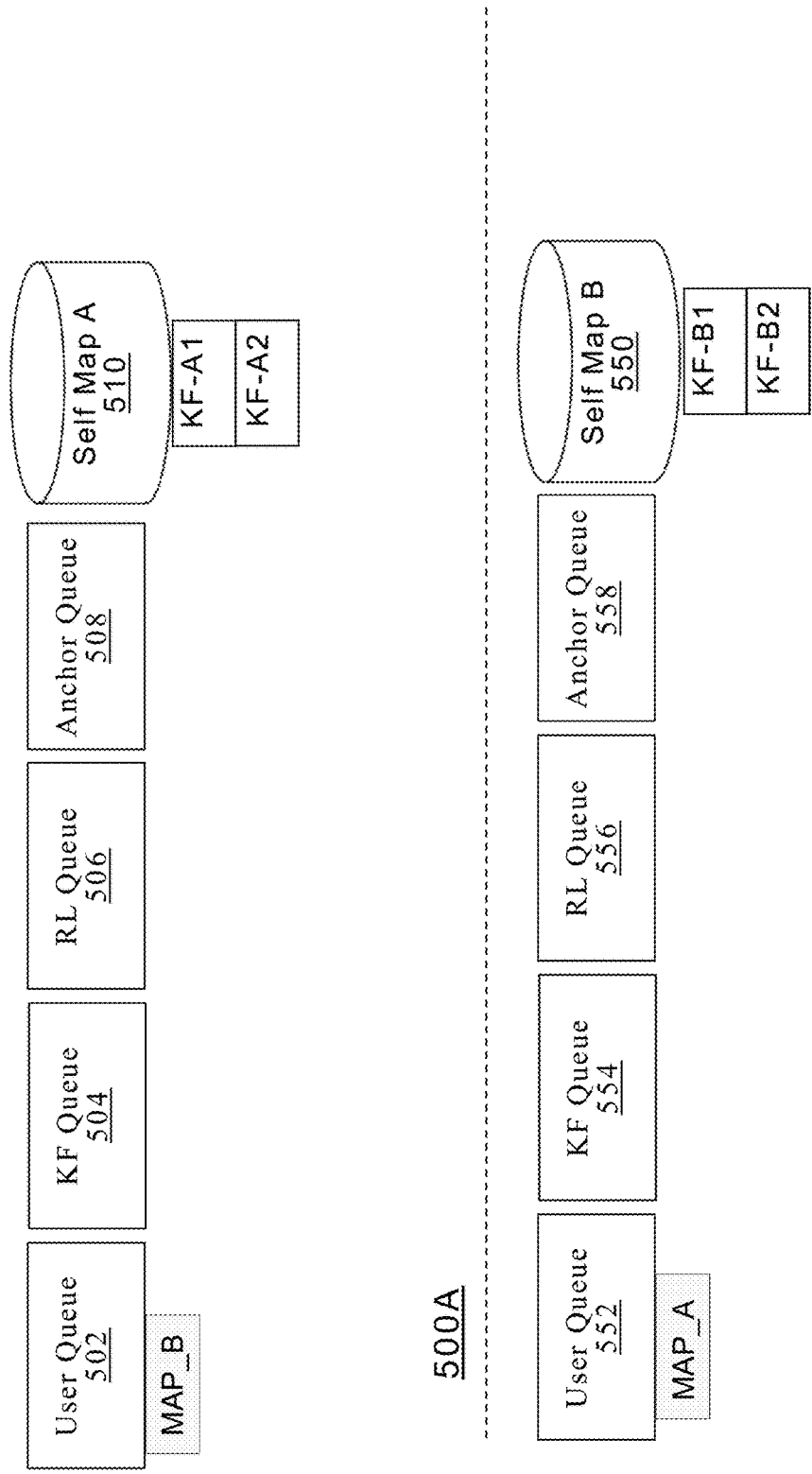

As shown in FIG. 5B, in various implementations, to begin a shared multiusers SLAM process, the electronic device 500A is joined by the electronic device 500B; or the electronic device 500B is joined by the electronic device 500A. In various implementations, the multiusers SLAM experience can be joined using a networking layer. In some implementations, the networking layer can be any conventional networking layer implemented by the electronic devices. In some implementations, the networking layer has no delay requirements (e.g., minimum message transfer times). In some implementations, upon joining the shared CGR experience and to begin the multiusers SLAM process, map registration data is shared or exchanged. In some implementations, the shared map registration data includes sending a current state of the local 3D map of each electronic device to all other electronic devices in the multiuser SLAM shared CGR experience.

In various implementations, for the electronic device 500A, the current state of a local 3D map 510 includes all keyframes generated (e.g., the pose graph of the electronic device 500A) and 3D map registration data. In some implementations, 3D map registration data includes all the hardware information of the electronic device 500A. For example, hardware information includes the image sensor (e.g., camera) parameters and additional sensor (e.g., depth, motion, inertial) parameters to allow proper use of each other electronic device's data (e.g., keyframe data). In some implementations, the keyframes and 3D map registration data are sent separately. In some implementations, the 3D map registration data is sent first and then each keyframe is sent afterwards. In some implementations, only a subset or a preset number of the keyframes of the current state of the electronic device are sent (e.g., to reduce an amount of data). In some implementations, only the 3D map registration data or hardware information is sent.

As shown in FIG. 5B, the electronic device 500B receives the current state of the electronic device 500A 3D map 510 (e.g., MAP_A) from the electronic device 500A and in some implementations stores that MAP_A data in a user queue 552 at the electronic device 500B. Also shown in FIG. 5B, the electronic device 500A receives the current state of device 500B 3D map 550 (e.g., MAP_B) from the electronic device 500B, and in some implementations stores that MAP_B data in a user queue 502 at the electronic device 500A. As shown in FIG. 5B, MAP_A and MAP_B are highlighted.

In various implementations, information stored in a queue at the electronic device 500B and the electronic device 500A is held there until the respective electronic device can properly process the queued information.

Figure 5C:
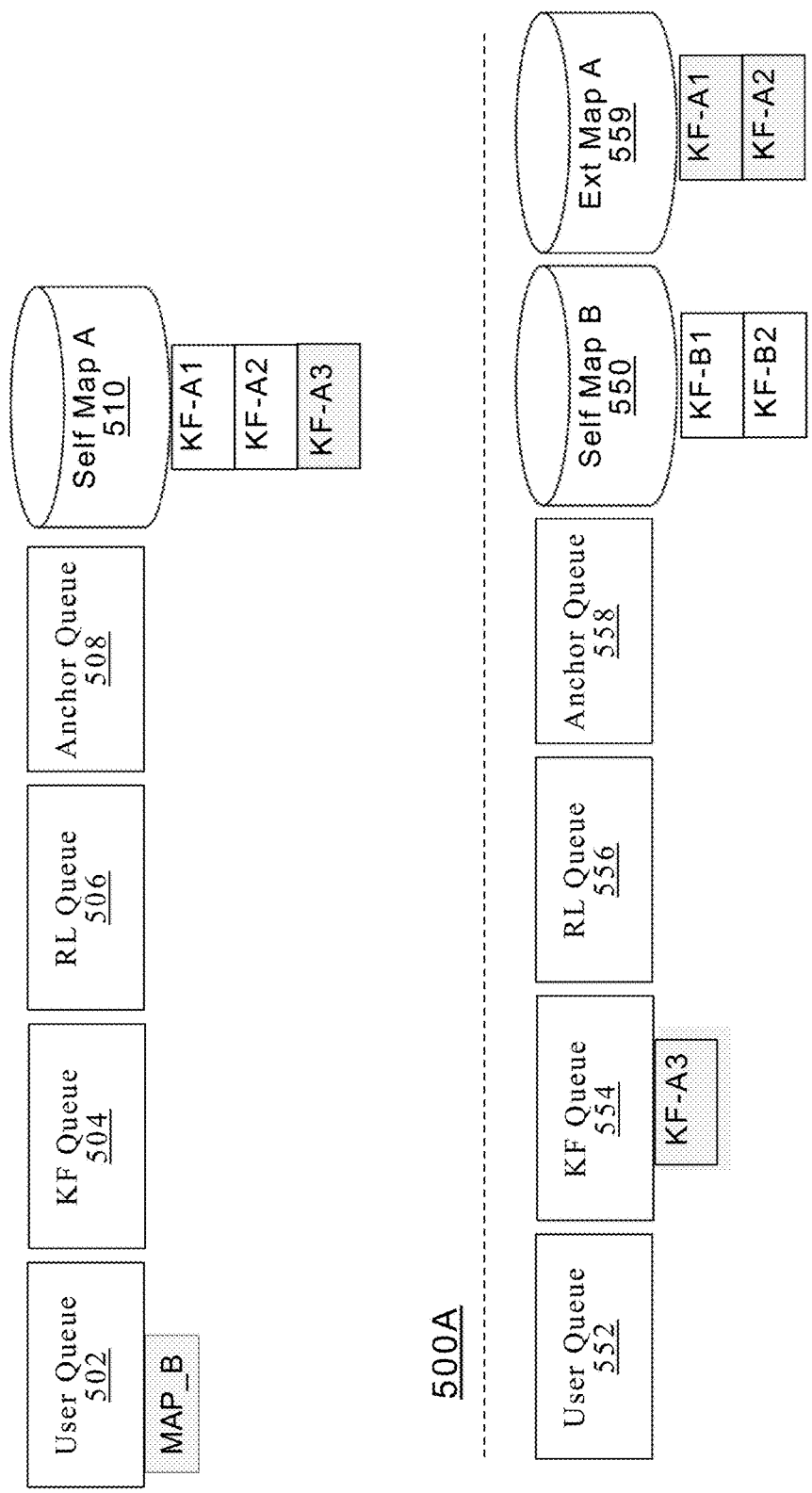

As shown in FIG. 5C, the electronic device 500B has created a local 3D external map 559 of the shared physical environment using the MAP_A information (e.g., locally reconstructed the CGR experience 505A). Accordingly, the MAP_A information has been removed from the user queue 552. The electronic device 500B has registered the first user (e.g., the electronic device 500A) by creating the first user external map 559. The electronic device 500B has created a local copy of the electronic device 500A 3D map (e.g., at the state of the electronic device 500A joined). In some implementations, as shown in FIG. 5C, the local external map 559 uses the two keyframes KF_A1 and KF_A2 and the hardware information of the electronic device 500A.

In some implementations, the keyframe queue 554, the RL queue 556, or the anchor queue 558 cannot be processed until the electronic device 500B creates an external 3D map for the corresponding electronic device (e.g., external 3D map 559 for the electronic device 500A).

As shown in FIG. 5C, at the same time, the electronic device 500A added a third keyframe KF_A3 to its 3D map. The electronic device 500B receives the third keyframe KF_A3 and stores the third keyframe KF_A3 in local keyframe queue 554. The electronic device 500B maintains the third keyframe KF_A3 in the keyframe queue 554 until the electronic device 500B has time or all relevant information to process the queued information.

Figure 5D:
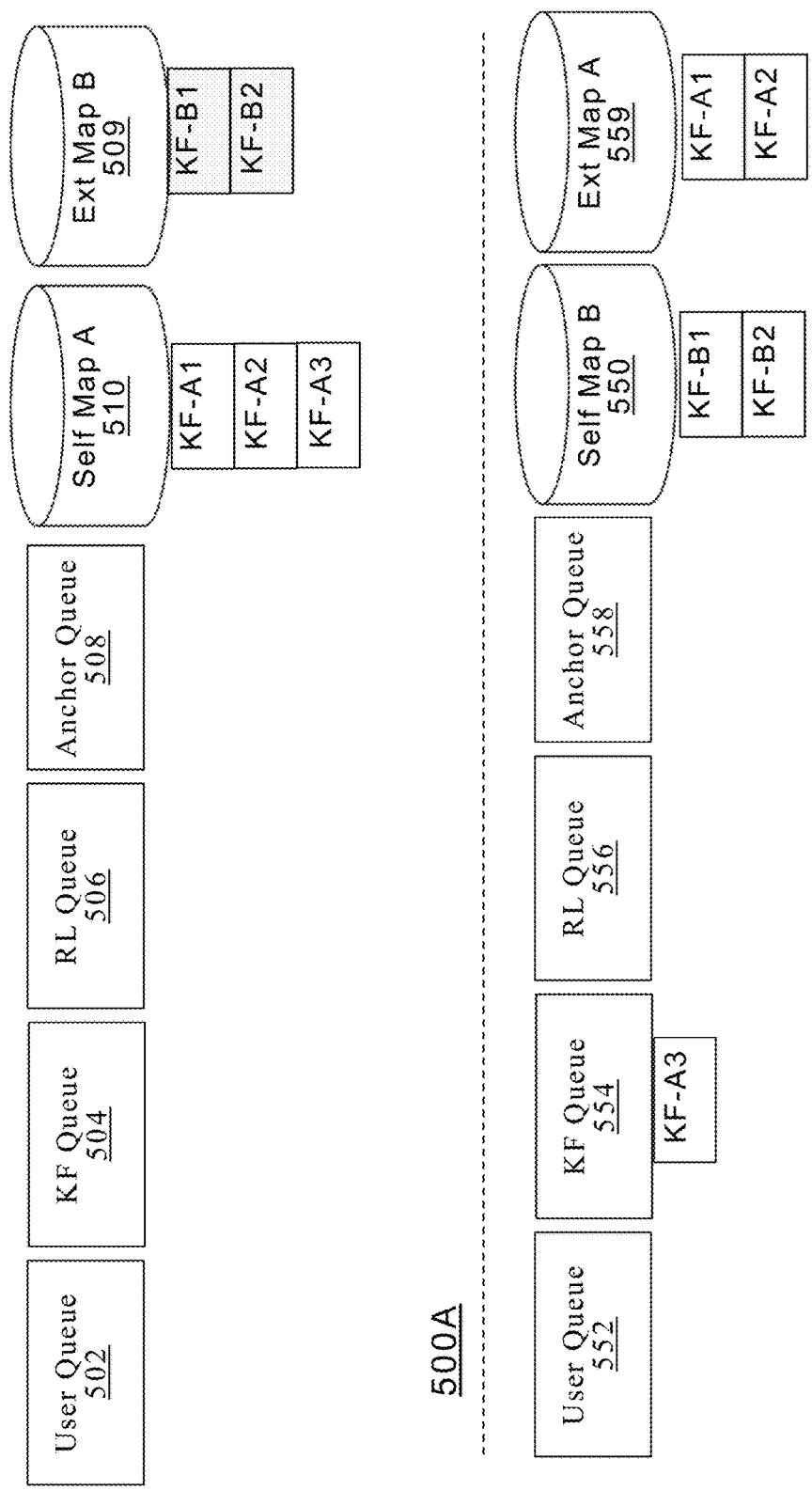

As shown in FIG. 5D, the electronic device 500A has created a local 3D external map 509 of the shared physical environment using the MAP_B information (e.g., locally reconstructed the CGR experience 505B). Accordingly, the MAP_B information has been removed from the user queue 502. The electronic device 500A has registered the second user (e.g., the electronic device 500B) by creating the second user external map 509. The electronic device 500A has created a local copy of the electronic device 500B 3D map (e.g., at the state of the electronic device 500B joined). As shown in FIG. 5D, the local external map 509 uses the two keyframes KF_B1 and KF_B2 and the hardware information of the electronic device 500B.

Again, as shown in FIG. 5D, the electronic device 500B has created the local 3D external map 559 of the shared physical environment using the MAP_A information. At this time, as shown in FIG. 5E, the electronic device 500B can process the third keyframe KF_A3 because the external map 559 has been created.

Figure 5E:
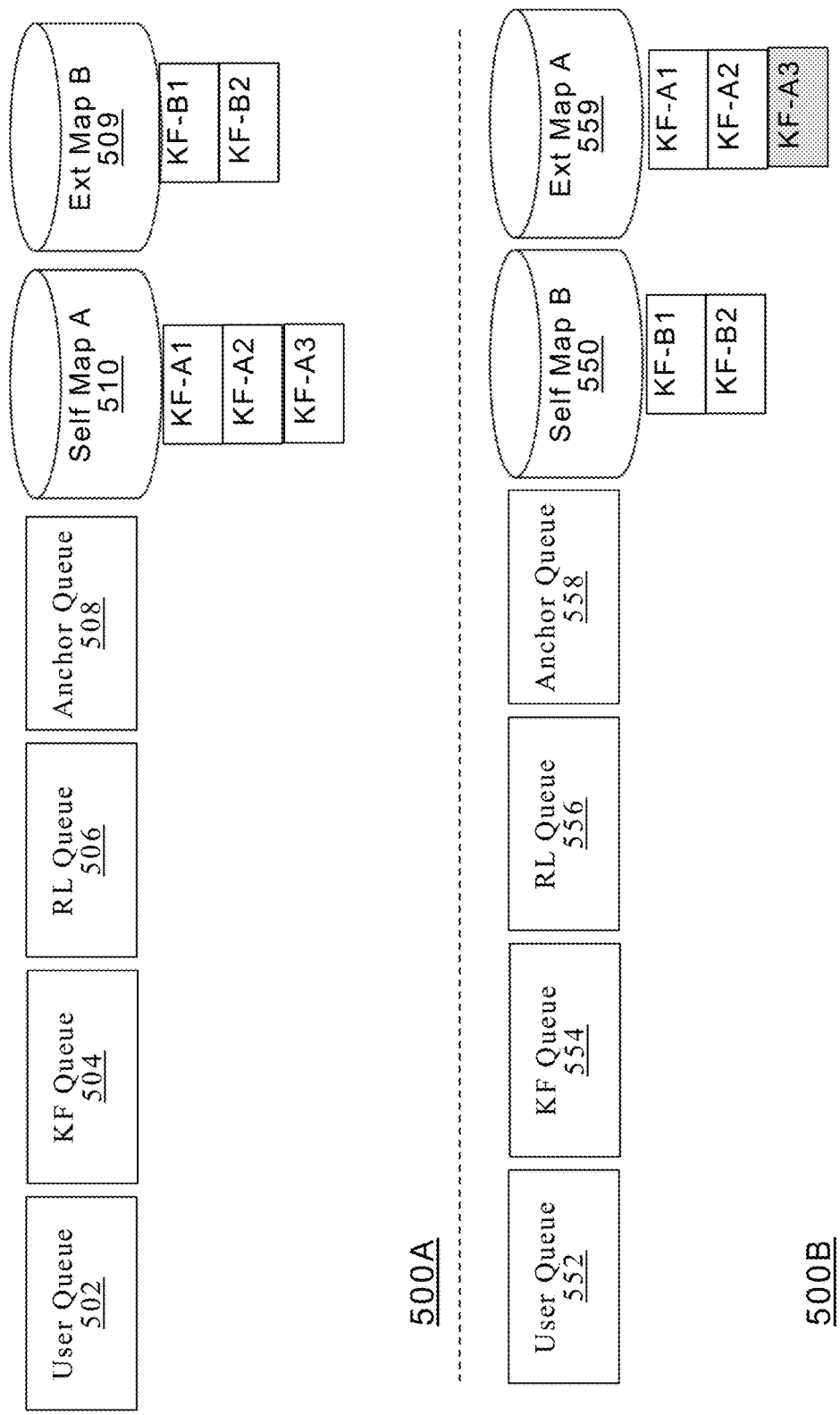

In various implementations, in FIG. 5E, the electronic device 500A has a corresponding 3D map 509 for the electronic device 500B. Similarly, the electronic device 500B has a corresponding 3D map 559 for the electronic device 500A. However, the electronic device 500A does not visualize or see any information from the electronic device 500B in the CGR experience 505A. Further, the electronic device 500B does not visualize or see any information from the electronic device 500A in the CGR experience 505B. The electronic device 500A has not merged any information from the electronic device 500B into its local 3D map 559 of the CGR experience 505A.

Figure 5F:
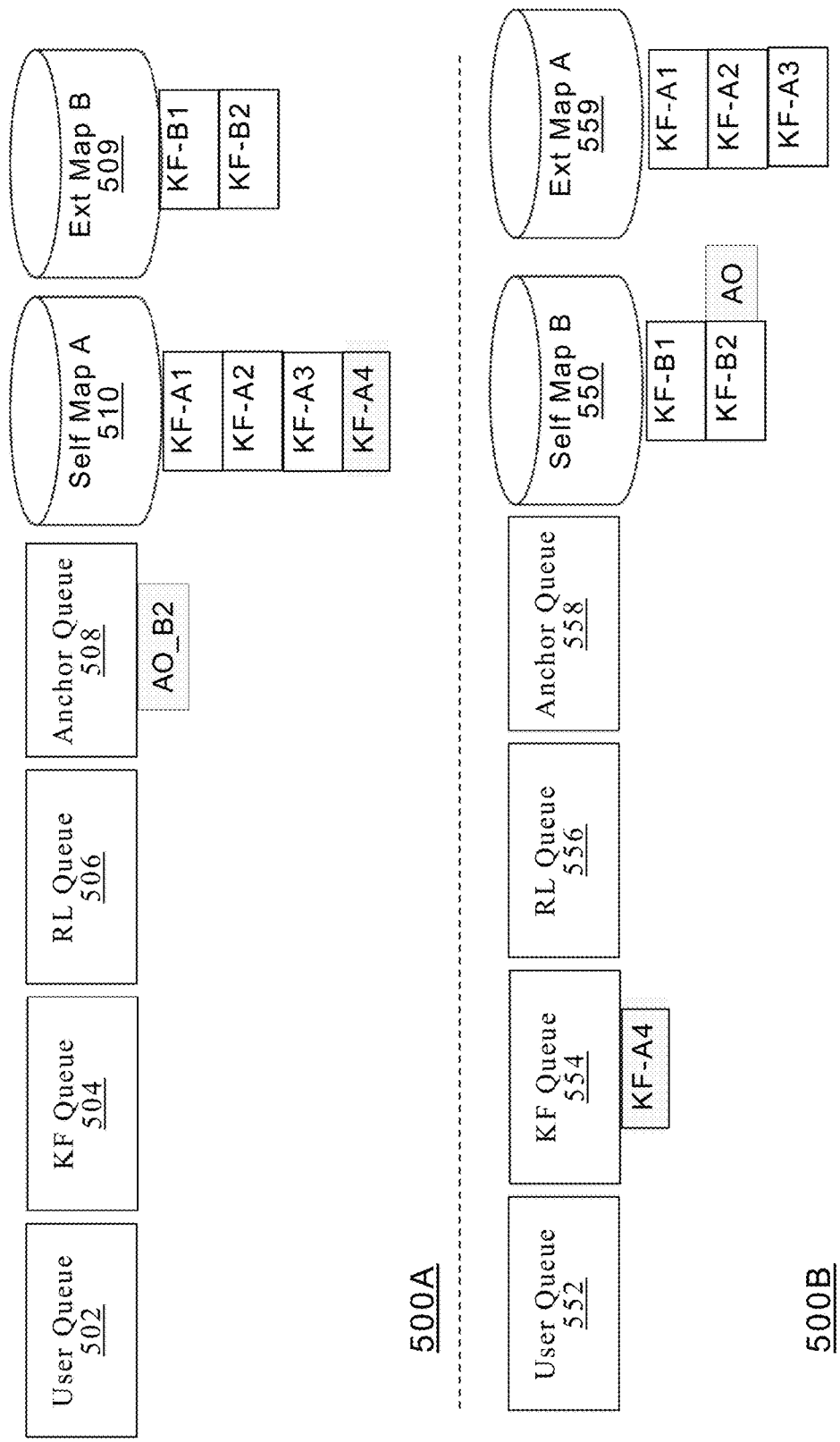

As shown in FIG. 5F, the electronic device 500B adds a first virtual object (VO) anchor OA_B2 to its own 3D map 550. In some implementations, each anchor is associated or attached to a keyframe. In FIG. 5F, the second user creates the first VO at the electronic device 500B and the first VO is attached to keyframe KF_B2 (e.g., placed in the CGR experience 505B). At the same time, the electronic device 500B transmits the first anchor OA_B2 to other electronic devices sharing the CGR experience. Thus, the electronic device 500A receives the first anchor OA_B2 and stores the first anchor OA_B2 in a local anchor queue 508. The electronic device 500A maintains the first anchor OA_B2 in the anchor queue 508 until the electronic device 500A has time or the relevant information to process the queued information.

As shown in FIG. 5F, at the same time, the electronic device 500A added a fourth keyframe KF_A4 to its 3D map 510. The electronic device 500B receives the fourth keyframe KF_A4 and stores the fourth keyframe KF_A4 in the local keyframe queue 554. The electronic device 500B maintains the fourth keyframe KF_A3 in the keyframe queue 554 until the electronic device 500B can properly process the queued information.

In some implementations, entries in each queue are processed at a different preset frequency. In some implementations, the user queue, the KF queue, the RL queue and the anchor queue are processed at different variable rates at a respective electronic device.

Figure 5G:
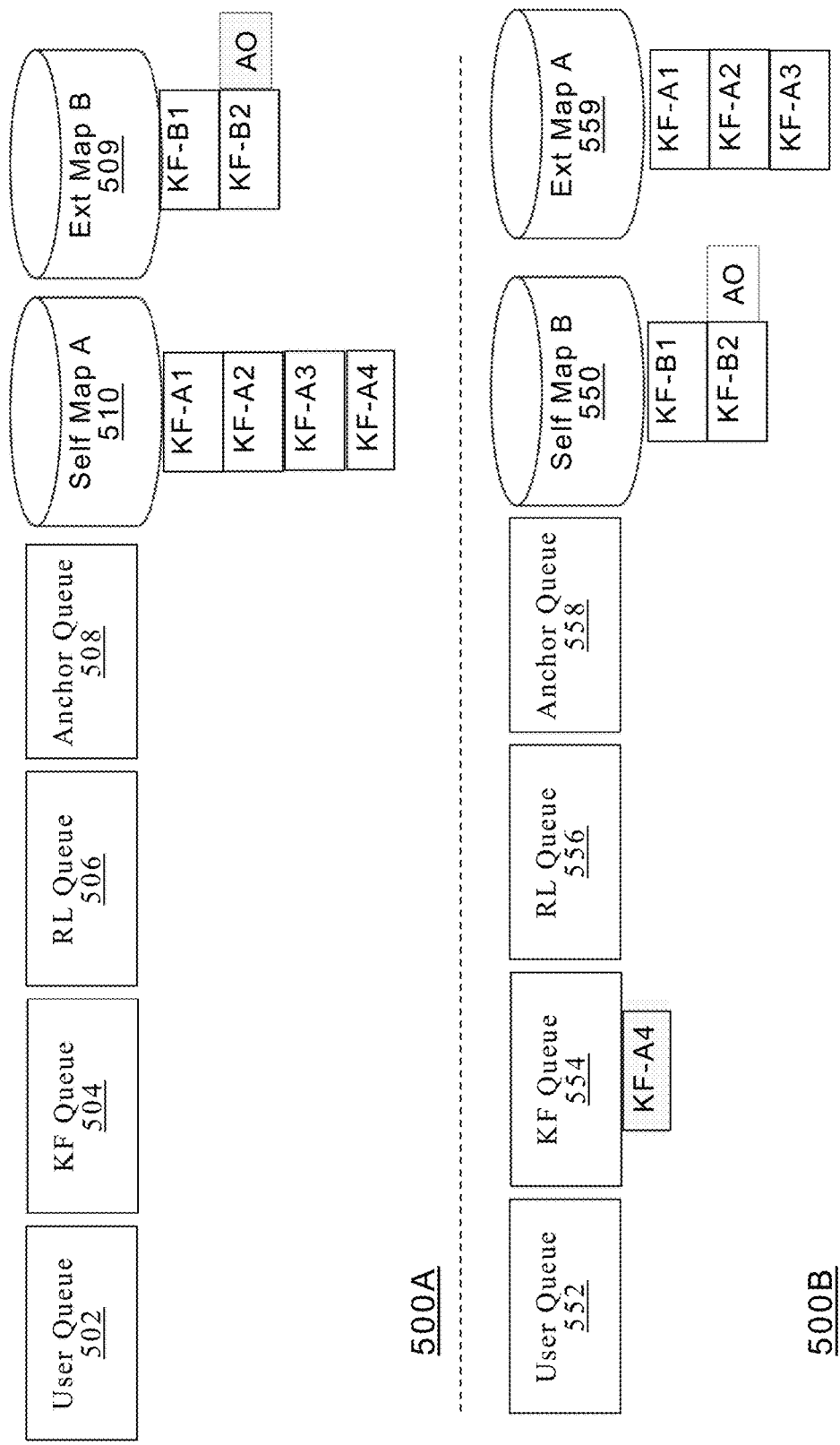

As shown in FIG. 5G, the electronic device 500A adds the first virtual object using the anchor OA_B2 to its external 3D map 509. In some implementations, the first anchor OA_B2 is again attached to keyframe KF_B2 in the external 3D map 509 (e.g., the same keyframe where first anchor OA_B2 was created at the electronic device 500B).

Once the electronic device 500B created the local 3D external map 559 of the shared physical environment using the MAP_A information, the electronic device 500B tries to match the 3D external map 559 to the local 3D map 550 of the electronic device 500B. In various implementations, the matching includes various known optimization techniques. In some implementations, the matching includes 3D to 3D feature matching techniques between a plurality of common features in the 3D external map 559 and the local 3D map 550. In some implementations, the matching includes 2D to 3D feature matching techniques between a plurality of common features in the 3D external map 559 and the local 3D map 550. In some implementations, the image data (or additional sensor data such as depth) captured by electronic device 500A and electronic device 500B corresponds to (e.g., includes data about) one or more portions of the same physical object in the physical environments. In some implementations, the plurality of matched common features in the 3D external map 559 and the local 3D map 550 generate a re-localization (e.g., 3D spatial transformation) between the estimated pose of the camera of the electronic device 500B in the 3D map 550 to the estimated pose of the camera of the electronic device 500A in the 3D map 559.

In some implementations, the plurality of matched common features are in a single keyframe in the 3D external map 559 and in a single keyframe in the local 3D map 550 and generate a re-localization result between the estimated pose of the camera in one keyframe of the 3D map 550 to the estimated pose of the camera in the corresponding keyframe in the 3D map 559.

Figure 5H:
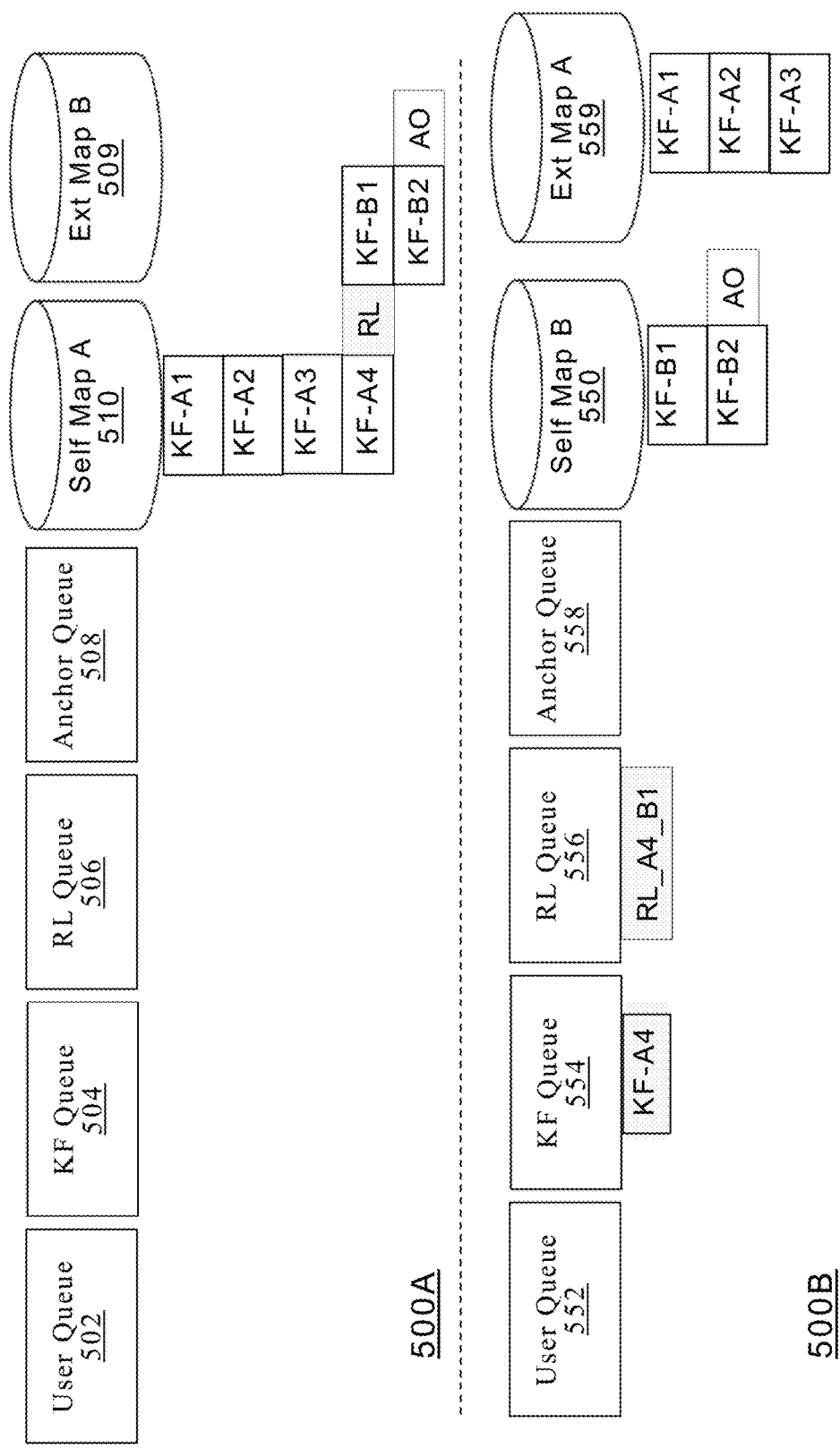

As shown in FIG. 5H, a re-localization result RL_A4_B1 was used to translate the pose used for the estimated 3D geometry of the camera of the electronic device 500A in the keyframe A4 in the 3D map 510 to the pose used for the estimated 3D geometry of the camera of the electronic device 500B in the keyframe B1 in the 3D external map 509. In some implementations, the re-localization data allow the electronic device 500A to combine the 3D external map 509 into the local 3D map 510 (e.g., pose graph). In some implementations, the electronic device 500A merges a part of the 3D external map 509 into the local 3D map 510 using the re-localization result.

Figure 5I:
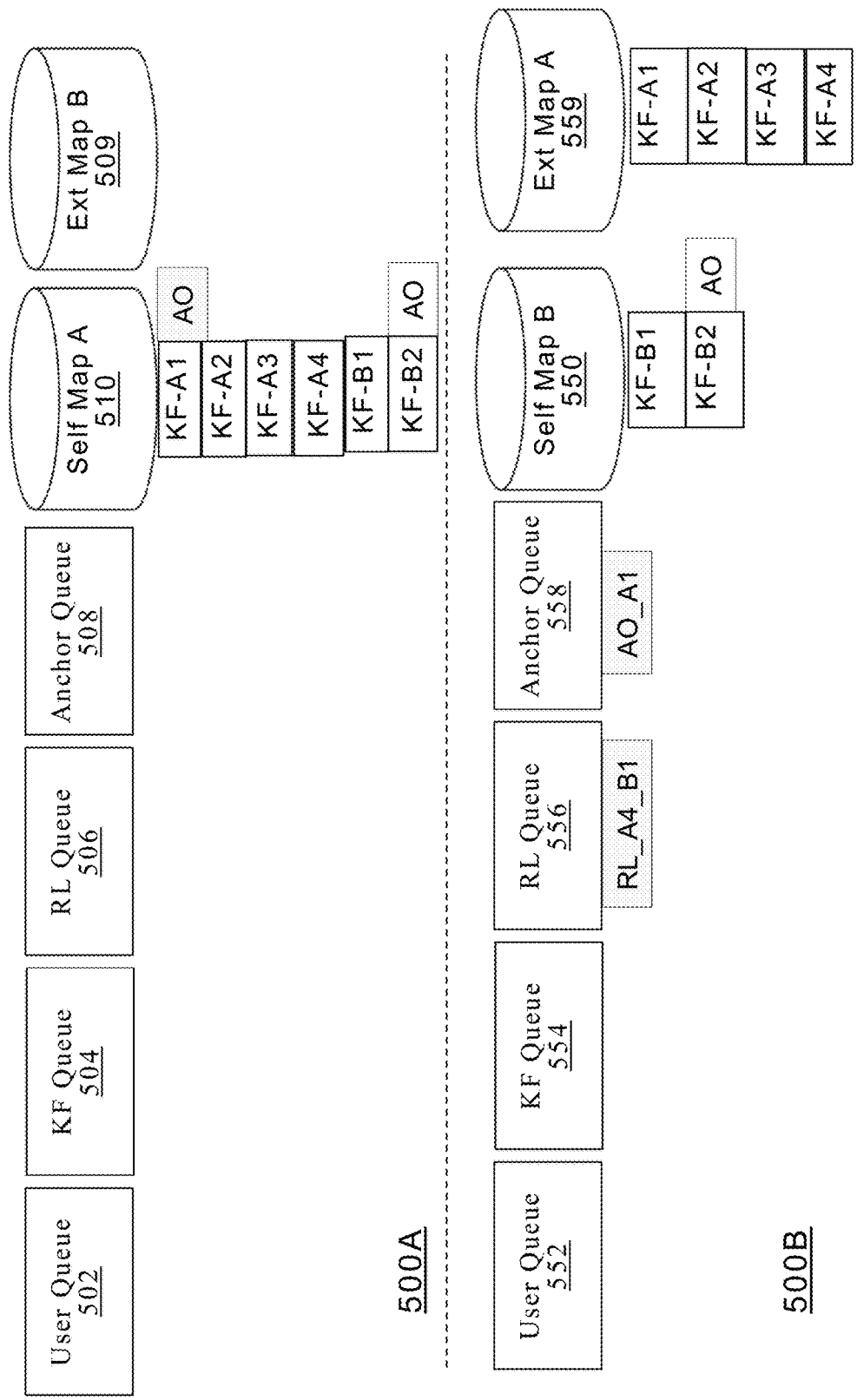

As shown in FIG. 5I, the electronic device 500A merged the 3D external map 509 of the electronic device 500B into the local 3D map 510, and shared the information used to perform the merge by the electronic device 500A. In some implementations, the re-localization result RL_A4_B1 is determined by matching features from keyframes of the electronic device 500B in the external 3D map 509 to features from keyframes of the electronic device 500A in the 3D map 510. In some implementations, the matching uses 2D or 3D spatial position estimates for features from the keyframes of the electronic device 500B and 2D or 3D spatial position estimates for features from the keyframes of the electronic device 500A. In some implementations, the matching of spatial position estimates for features from the keyframes of the electronic device 500B and spatial position estimates for features from the keyframes of the electronic device 500A depends on the type of imaging sensor or cameras on the respective electronic devices. In some implementations, the matching of spatial position estimates for features of the electronic device 500B and spatial position estimates for features of the electronic device 500A depends on the type of additional sensors (e.g., depth sensors, inertial sensors, IR sensors, motion sensors, etc.) on the respective electronic devices.

In various implementations, the re-localization result RL_A4_B1 uses correspondences of matched features from the electronic device 500B in the external 3D map 509 and the electronic device 500A in the 3D map 510 to select an estimated pose of the electronic device 500B that reduces or minimizes (e.g., an optimization process) an error between the estimated spatial positions of the matched features. In some implementations, the re-localization result RL_A4_B1 is a translation between the selected pose of the camera of the electronic device 500B for keyframe B4 and the estimated pose of the camera for the keyframe A4 known by the electronic device 500A.

In some implementations, because the 3D map 509 includes the information relating each keyframe (e.g., KF_B1, KF_B2) to each other keyframe in the 3D map 509, once the keyframe B1 is merged into the 3D map 510, all other keyframes from the 3D map 509 (e.g., the electronic device 500B) can be merged into the 3D map 510 using relational information relative to the merged keyframe B1. Thus, as shown in FIG. 5I at the electronic device 500A, the re-localization result RL_A4_B1 is used to merge the 3D map 509 information from into the 3D map 510.

Further, as shown in FIG. 5I, at the same time, the electronic device 500B adds the fourth keyframe KF_A4 into the external 3D map 559, and the electronic device 500A adds a second virtual object anchor OA_A1 to its own 3D map 510. In FIG. 5I, the first user creates the second VO at the electronic device 500A associated or attached to keyframe KF_A1. At the same time, electronic device 500A transmits the second anchor OA_A1 to other electronic devices sharing the CGR experience. Thus, the electronic device 500B receives the second anchor OA_A1 and stores the second anchor OA_A1 in the local anchor queue 558. The electronic device 500B maintains the second anchor OA_A1 in the anchor queue 558 until the electronic device 500B has time to process the queued information.

Figure 5J:
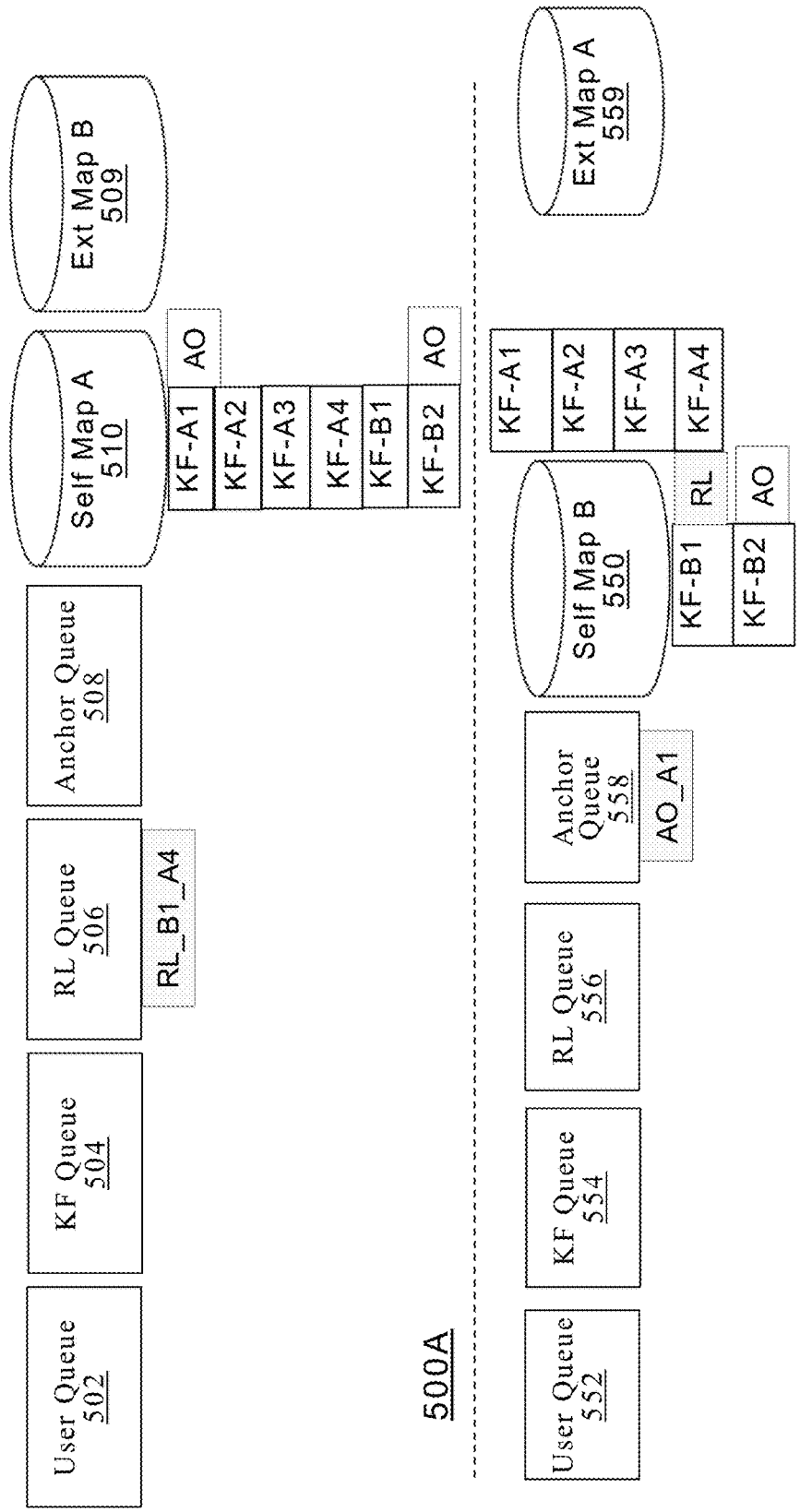

As shown in FIG. 5J, a re-localization result RL_B1_A4 was used to translate the pose used for the estimated 3D geometry of the camera of the electronic device 500B in the keyframe B1 in the 3D map 550 to the pose used for the estimated 3D geometry of the camera of the electronic device 500A in the keyframe A4 in the 3D external map 559. In some implementations, the re-localization data allow the electronic device 500B to merge a part or all of the 3D external map 559 into the local 3D map 550. Example techniques for determining the re-localization result RL_B1_A4 were described herein with respect to FIG. 5H and the electronic device 500A.

Figure 5K:
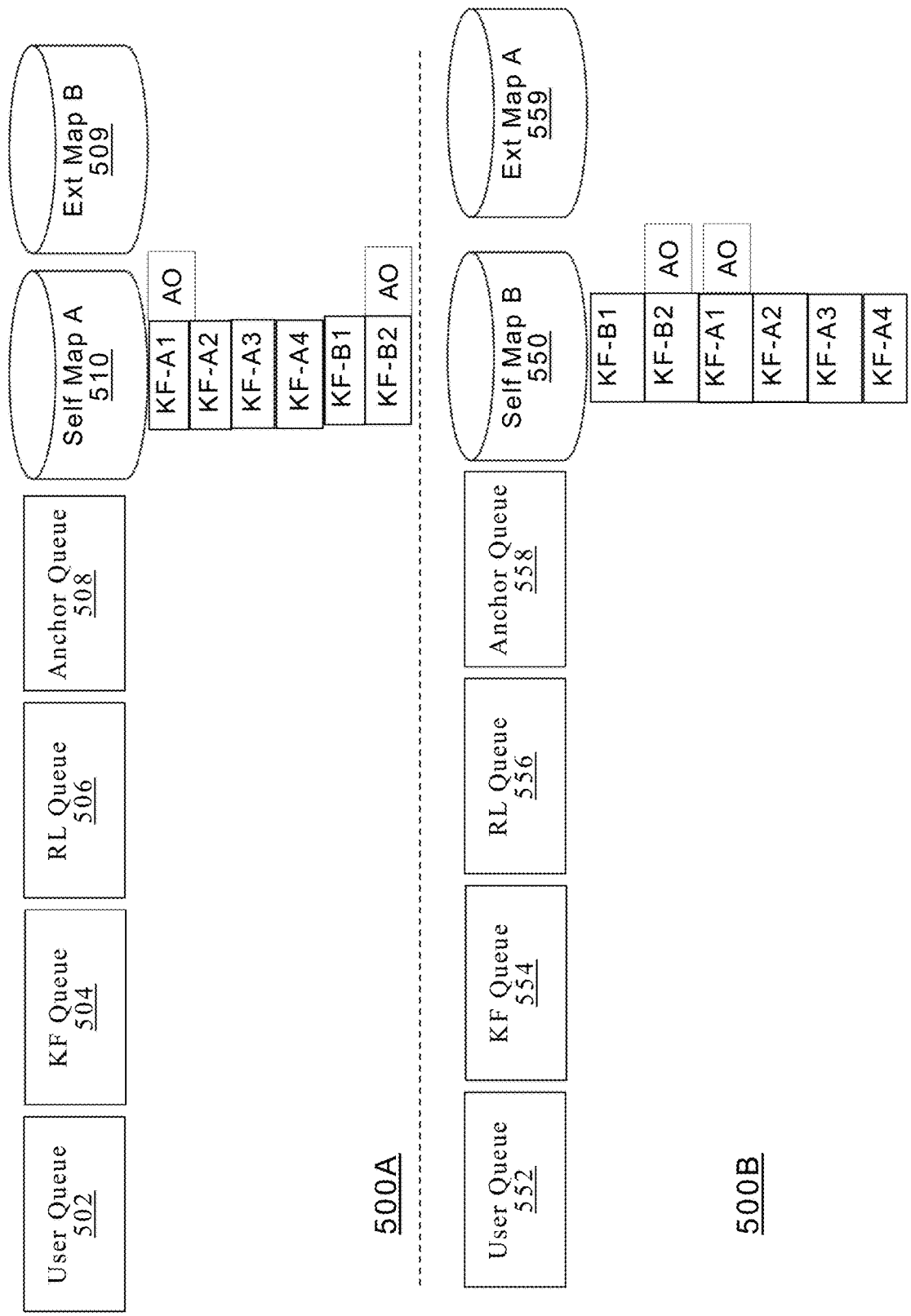

As shown in FIG. 5K, the electronic device 500B uses the re-localization result RL_B1_A4 to merge the 3D map information from keyframe A4 into the 3D map 550. As the 3D map 559 (e.g., pose graph) includes the information relating each keyframe (e.g., KF_A1, KF_A2, KF_A3, KF_A4) to each other keyframe in the 3D map 559, once the keyframe A4 is merged into the 3D map 550, all other keyframes from the 3D map 559 (e.g., the electronic device 500B) are merged into the 3D map 550 using relational information relative to the merged keyframe A4. Thus, as shown in FIG. 5K at the electronic device 500B, the re-localization result RL_B1_A4 is used to merge the 3D map 559 information into the 3D map 550. In some implementations, different paired keyframes can be used at each separate electronic device of the group of electronic devices sharing the CGR experience to merge the respective external 3D map to the local 3D map.

As shown in FIG. 5K, the electronic device 500B adds the second virtual object anchor OA_A1 to its 3D map 550. In FIG. 5K, the second VO anchor OA_A1 is attached to keyframe KF_A1 in the 3D map 550 (e.g., the same keyframe where second VO anchor OA_A1 was created at the electronic device 500A).

As shown in FIG. 5K, the electronic device 500A and the electronic device 500B have corresponding or "similar" 3D maps used for the respective CGR experience 505A and the CGR experience 505B. In some implementations, the 3D map 510 corresponds to the 3D map 550 when each has the same amount of information (e.g., keyframes, pose graphs, sensor parameters, virtual objects, etc.) and each electronic device separately uses that information (e.g., in its SLAM optimizer) to estimate the keyframe poses in their individual 3D map. In some implementations, the 3D map 510 corresponds to the 3D map 550 when each has the same information, but each electronic device separately uses that information (e.g., in its SLAM optimizer) to estimate the keyframe poses in their individual 3D map in a local 3D coordinate system. In some implementations, the 3D map 510 corresponds to the 3D map 550 when each has the same relative information, but each electronic device separately and individually merges that information at its local 3D map.

In some implementations, the 3D map 510 corresponds to the 3D map 550 when each has the same amount of relative information, but control of the CGR experience is decentralized to each individual electronic device in the CGR experience at its local 3D map.

Figure 5L:
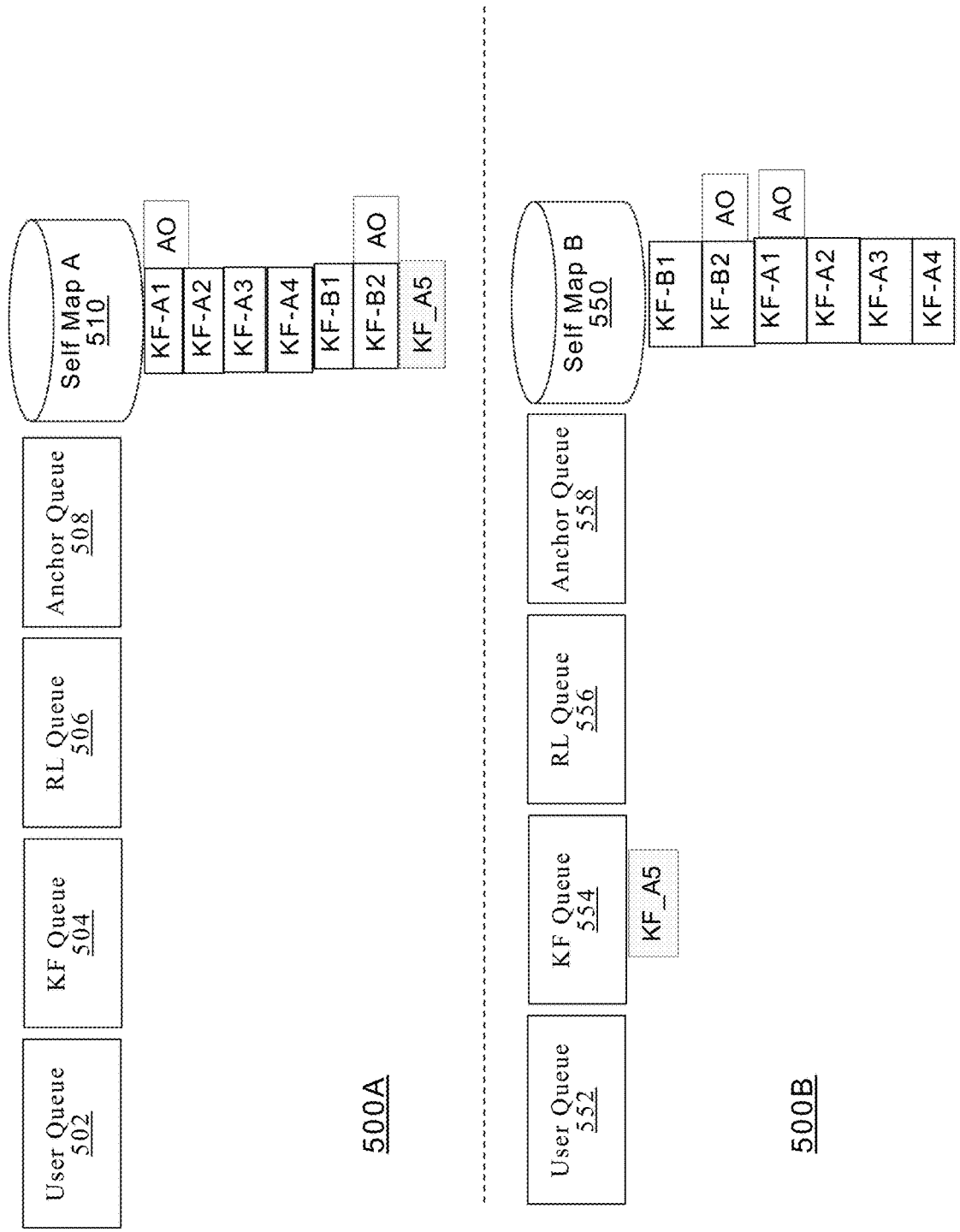

As shown in FIG. 5L, the electronic device 500A added a fifth keyframe KF_A5 to its 3D map 510. The electronic device 500B receives the fifth keyframe KF_A5 and can directly add the fifth keyframe KF_A5 from the keyframe queue 554 to the 3D map 550 (see FIG. 5M). In some implementations, the electronic device 500B can directly add the fifth keyframe KF_A5 from the keyframe queue 554 to the 3D map 550 because the relationship to one or more other keyframes of the electronic device 500A is known and allows the immediate inclusion of the fifth keyframe KF_A5 to the 3D map 550. In some implementations, the external map A 559 is not used after the re-localization results allow merging of the external map A 559 to the 3D map 550.

Figure 5M:
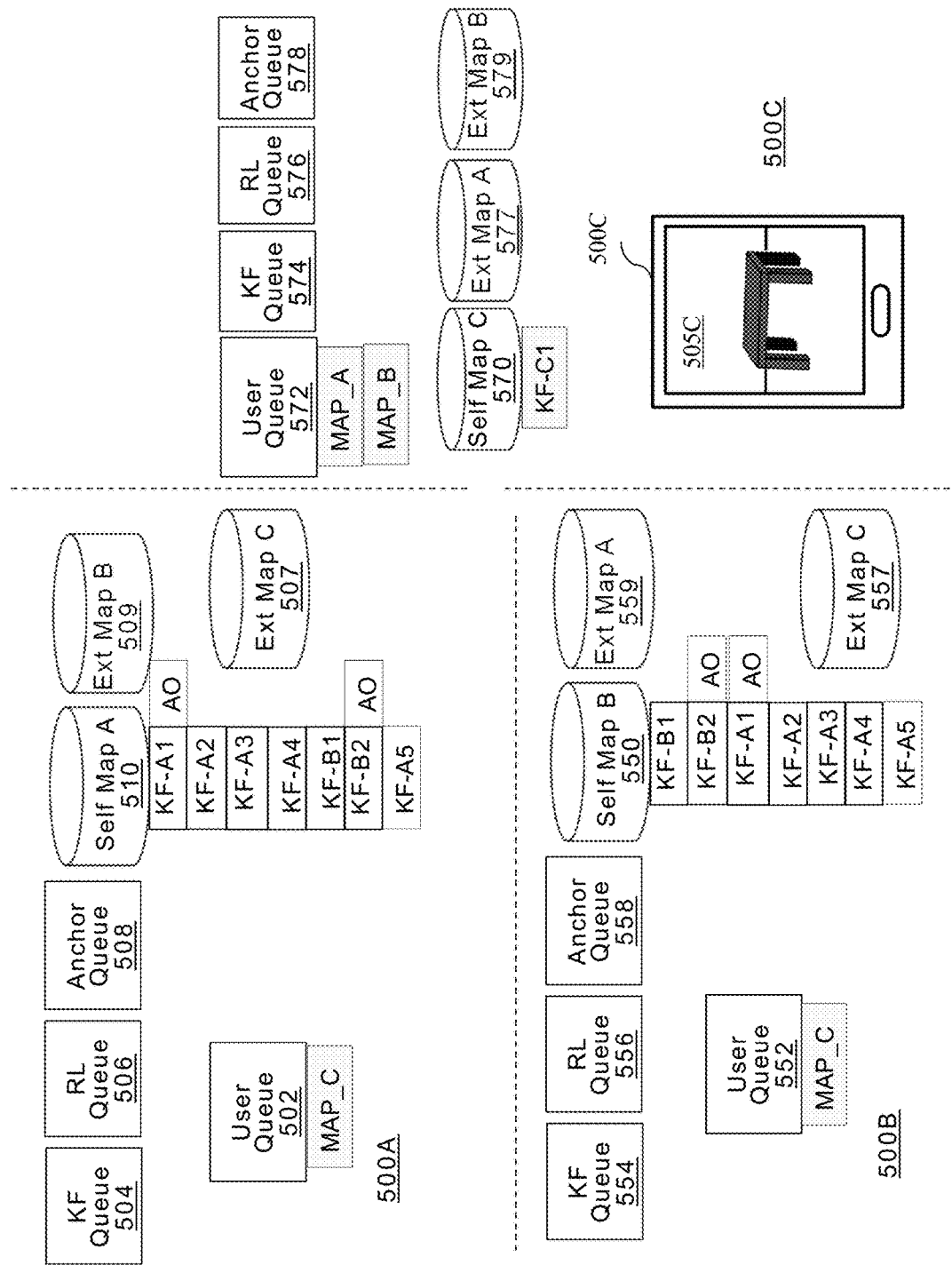

As shown in FIG. 5M, two users belong to a shared multiuser CGR experience in a shared physical environment. As shown in FIG. 5M, electronic device 500C starts and upon successful localization and mapping, the electronic device 500C (e.g., a third user) joins the shared CGR experience with a single keyframe KF_C1.

In some implementations, upon joining the shared CGR experience and to begin the multiuser SLAM process, shared map registration data is exchanged. In some implementations, the shared map registration data includes sending a current state of the local 3D map of each electronic device to all other electronic devices in a multiuser SLAM shared CGR experience. The shared map registration data was described herein with respect to FIG. 5B.

As shown in FIG. 5M, the electronic device 500A receives the current state of the electronic device 500C 3D map 570 (e.g., MAP_C) from the electronic device 500C and stores that MAP_C data in a user queue 502 at the electronic device 500A. The electronic device 500B receives the current state of the electronic device 500C 3D map 570 (e.g., MAP_C) from the electronic device 500C and stores that MAP_C data in a user queue 552 at the electronic device 500B. As shown in FIG. 5M, the electronic device 500C receives the current state of the electronic device 500A 3D map 510 (e.g., MAP_A) from the electronic device 500A and the current state of the electronic device 500B 3D map 550 (e.g., MAP_B) from the electronic device 500B and stores that MAP_A and MAP_B data in a user queue 572 at the electronic device 500C. In alternative implementations, one electronic device in the shared CGR experience transfers the current state of all electronic devices to the joining electronic device (e.g., the electronic device 500A sends the MAP_A and the MAP_B data to the electronic device 500C). In some implementations, the transfer of the current state of the electronic device 500A and the electronic device 500B can be performed using other designated responsibilities.

Figure 5N:
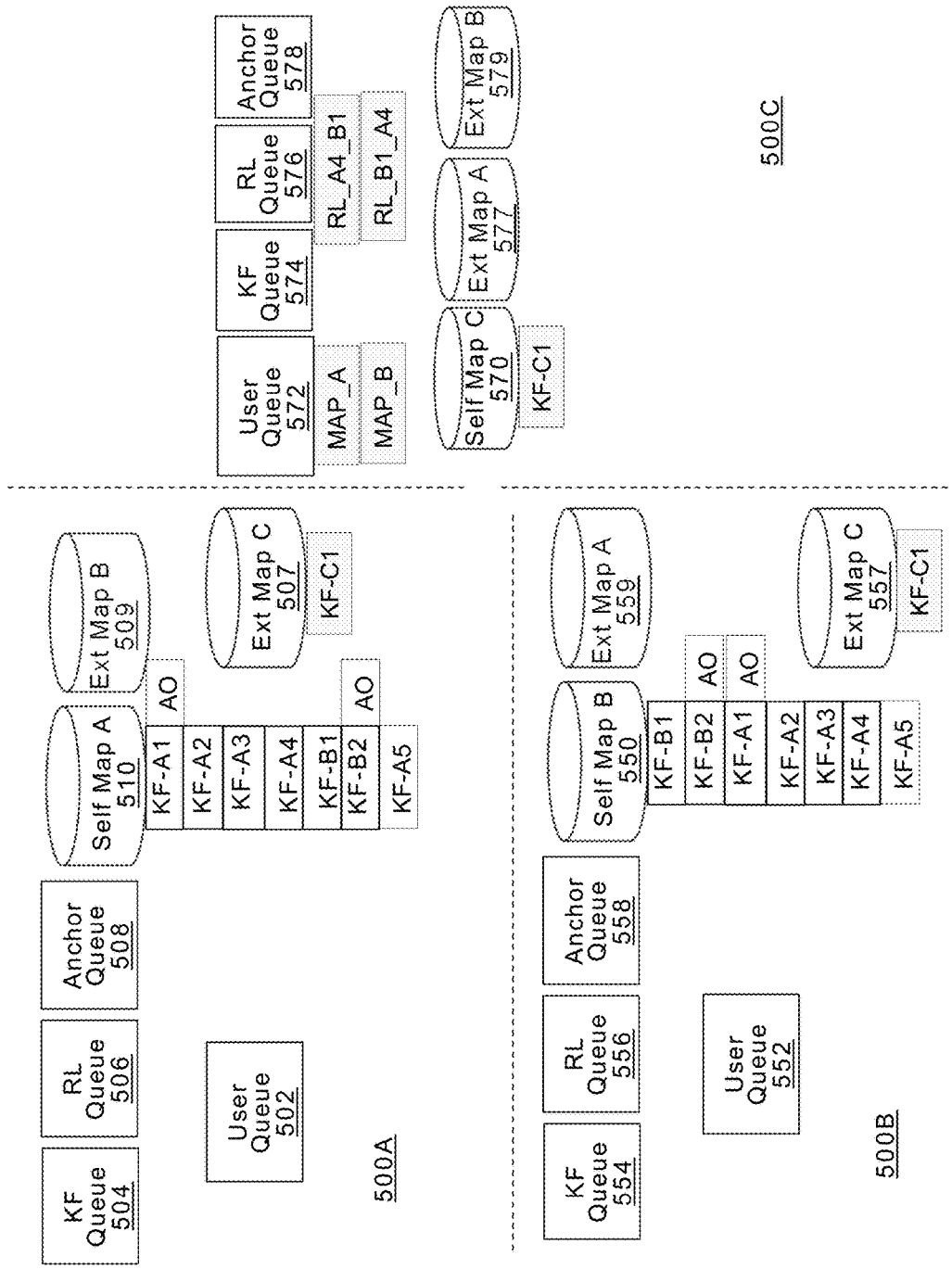

As shown in FIG. 5N, the electronic device 500A has created a local 3D external map 507 of the shared physical environment using the MAP_C information (e.g., keyframe KF_C1 and the hardware information of the electronic device 500C). As shown in FIG. 5N, the electronic device 500B has created a local 3D external map 557 of the shared physical environment using the MAP_C information. The local copy or external 3D maps were described herein with respect to FIG. 5C.

Further, in FIG. 5N, the electronic device 500B sent the re-localization result RL_B1_A4 to the electronic device 500C, which stored it in the RL queue 576. Similarly, the electronic device 500A sent the re-localization result RL_A4_B1 to the electronic device 500C, which stored it in the RL queue 576.

Figure 5O:
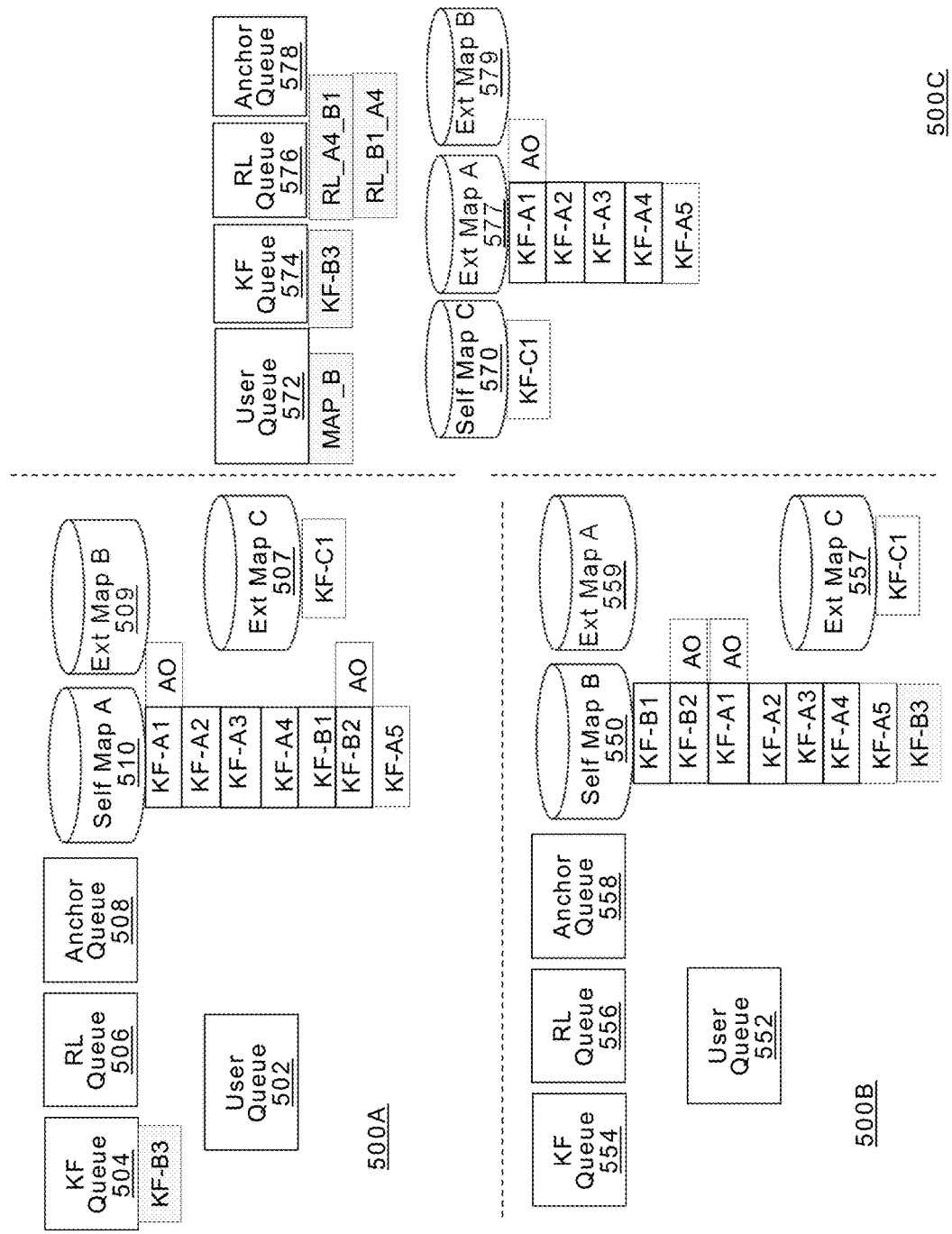

As shown in FIG. 5O, the electronic device 500C has created a local 3D external map 577 of the shared physical environment using the MAP_A information. Accordingly, the MAP_A information has been removed from the user queue 572. In some implementations, as shown in FIG. 5O, the external 3D map 577 uses keyframes KF_A1, KF_A2, KF_A3, KF_A4, and KF_A5, virtual object A1, and the hardware information of the electronic device 500A. At this time, as shown in FIG. 5O, the electronic device 500B creates a third keyframe KF_B3 in its 3D map 550. The electronic device 500A and the electronic device 500C receive and respectively store the third keyframe KF_B3 in the KF queue 504 and the KF queue 574.

Figure 5P:
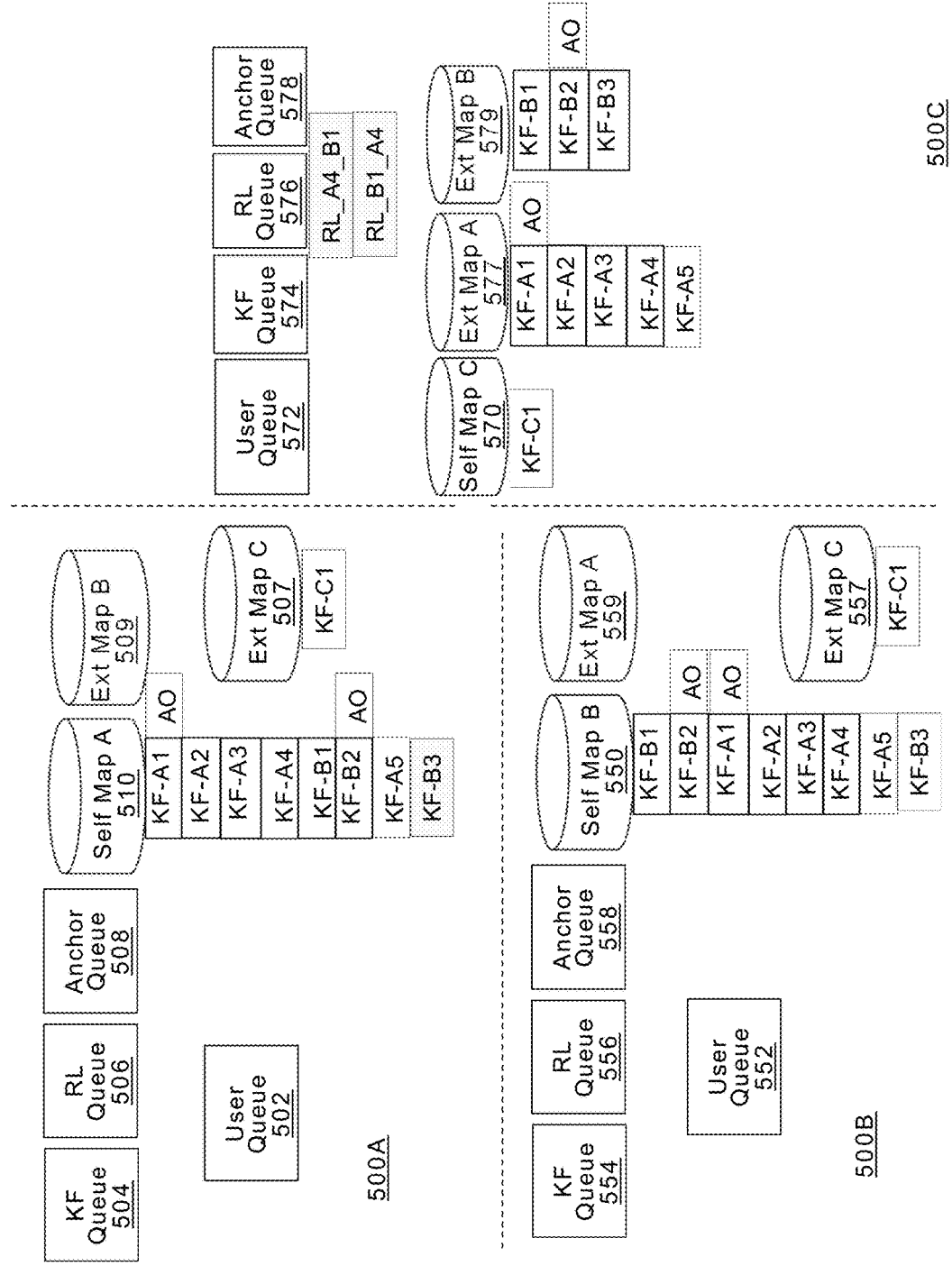

As shown in FIG. 5P, the electronic device 500C has created a local 3D external map 579 of the shared physical environment using the MAP_B information. Accordingly, the MAP_B information has been removed from the user queue 572. In some implementations, as shown in FIG. 5P, the external 3D map 579 uses keyframes KF_B1, KF_B2, and KF_B3, virtual object B2, and the hardware information of the electronic device 500B. Also as shown in FIG. 5P, the electronic device 500A directly adds the third keyframe KF_B3 from the keyframe queue 504 to the 3D map 510.

Figure 5Q:
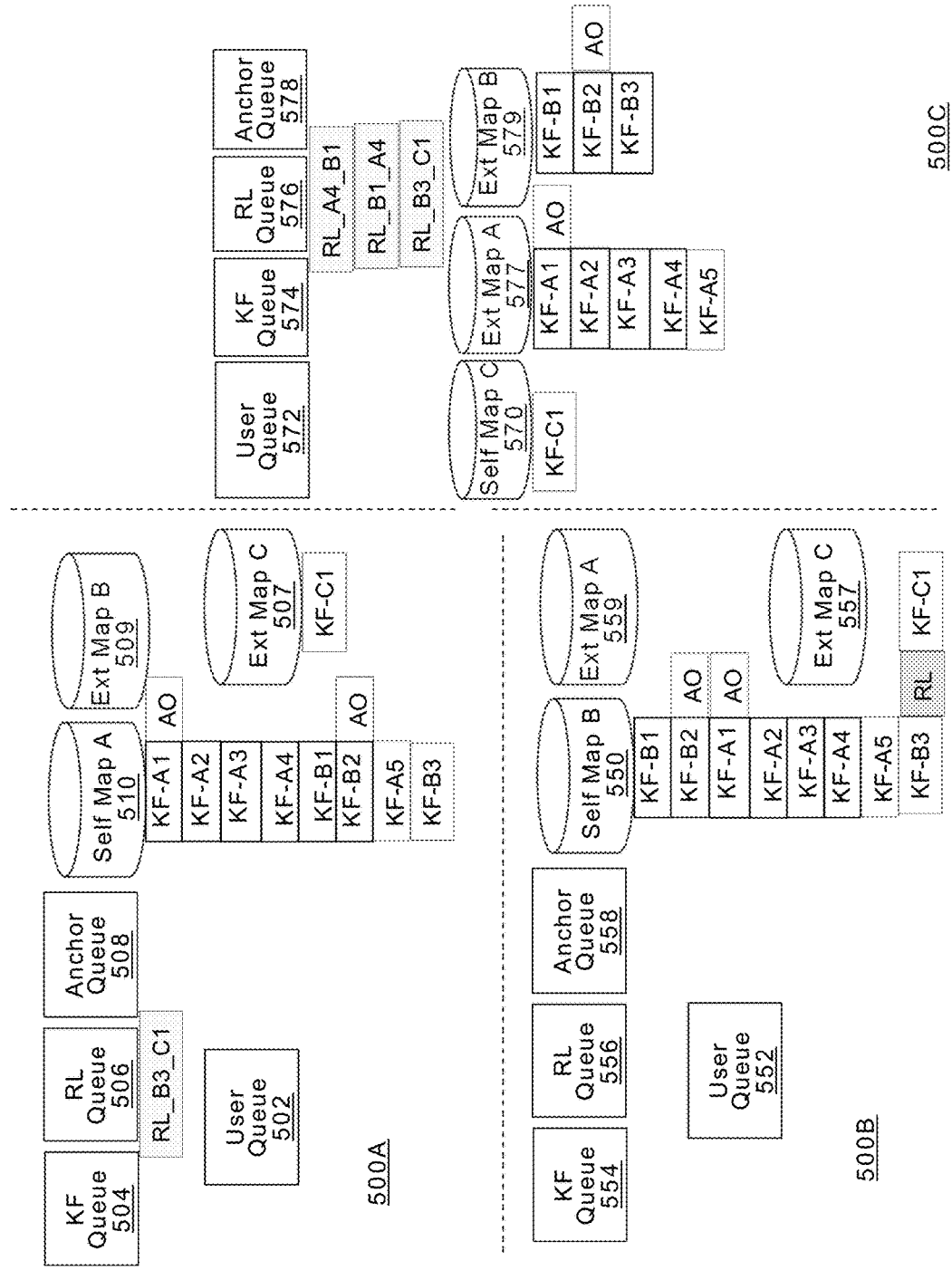

As shown in FIG. 5Q, a re-localization result RL_B3_C1 was used to translate the pose used for the estimated 3D geometry of the camera of the electronic device 500B in the keyframe B3 in the 3D map 550 to the pose used for the estimated 3D geometry of the camera of the electronic device 500C in the keyframe C1 in the 3D external map 557. In some implementations, the re-localization data allow the electronic device 500B to merge a part or all of the 3D external map 557 into the local 3D map 550. Example techniques for determining and using re-localization results (e.g., RL_B1_A4) were described herein with respect to FIG. 5H. Further in FIG. 5Q, the electronic device 500A received and stored the re-localization result RL_B3_C1 in the RL queue 506, and the electronic device 500C received and stored the re-localization result RL_B3_C1 in the RL queue 576.

Figure 5R:
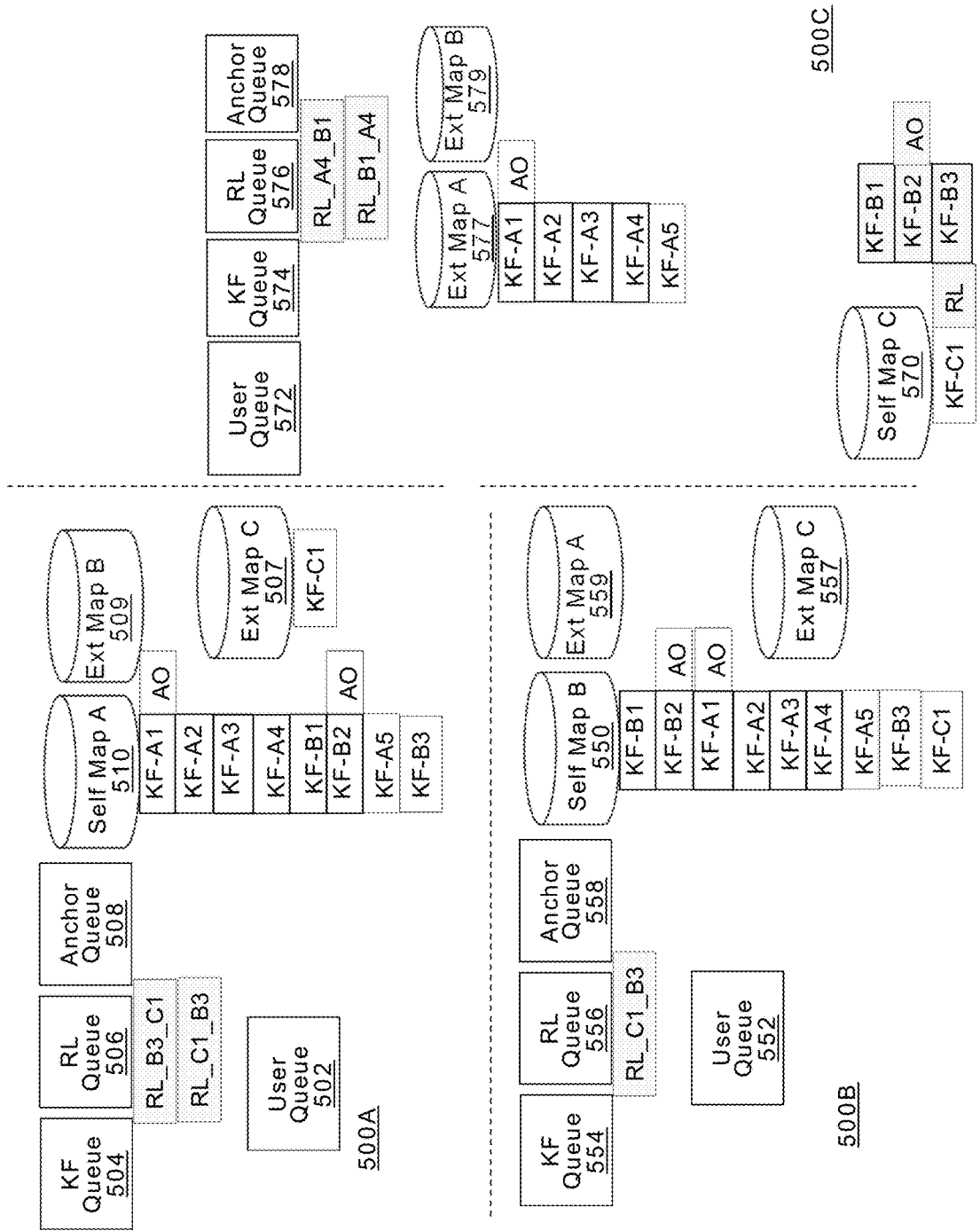

As shown in FIG. 5R, the electronic device 500B uses the re-localization result RL_B3_C1 to merge the 3D map information from keyframe C1 into the 3D map 550. Also, as shown in FIG. 5R, a re-localization result RL_C1_B3 is used to translate the pose used for the estimated 3D geometry of the camera of the electronic device 500C in the keyframe C1 in the 3D map 570 to the pose used for the estimated 3D geometry of the camera of the electronic device 500B in the keyframe B3 in the 3D external map 579. In some implementations, the re-localization result RL_B3_C1 is removed from the RL queue upon determination of the re-localization result RL_C1_B3. In some implementations, the re-localization result RL_B3_C1 assisted in the determination of the re-localization result RL_C1_B3 at the electronic device 500C.

Figure 5S:
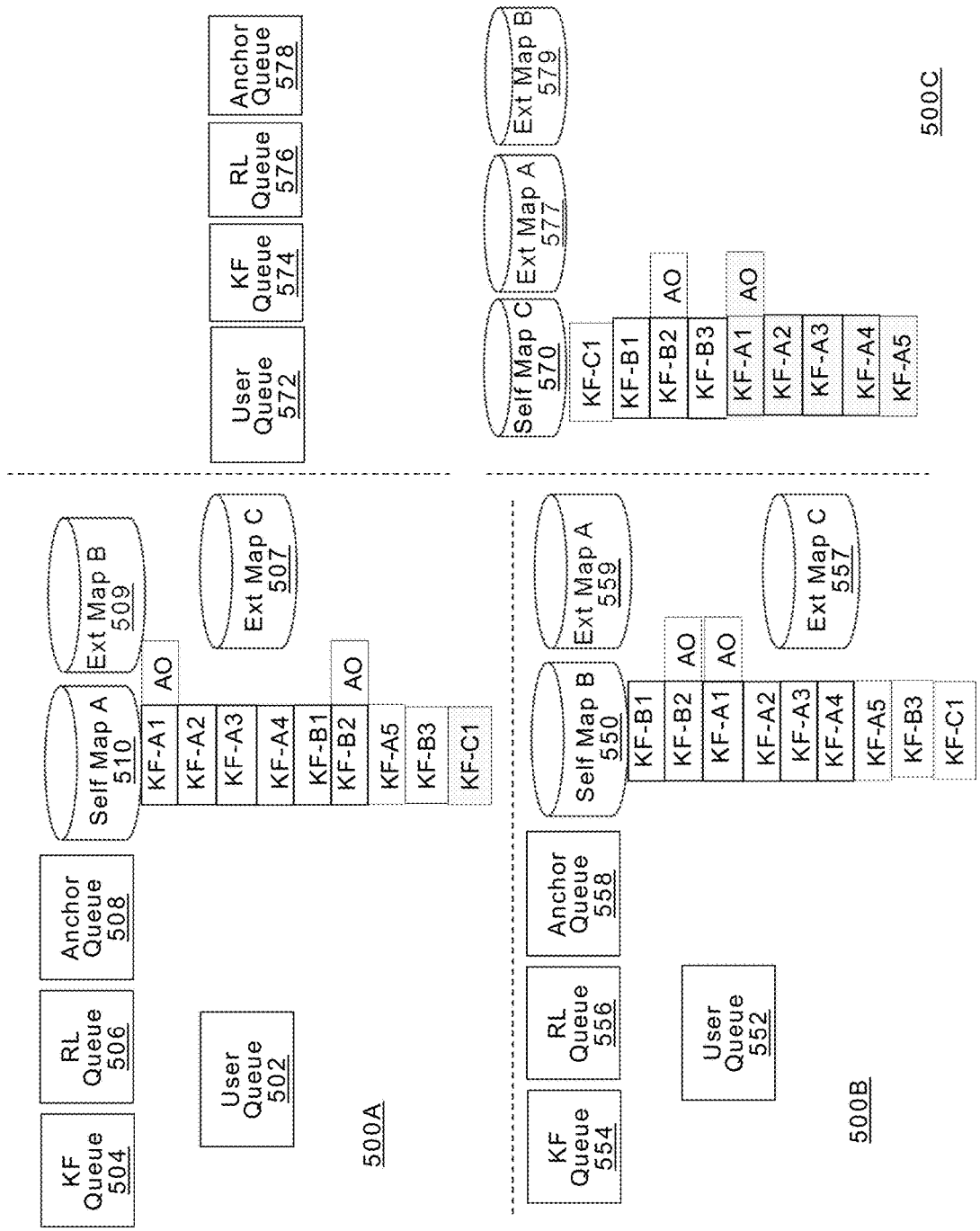

As shown in FIG. 5S, the electronic device 500A uses the re-localization result RL_B3_C1 to merge the 3D map information from keyframe C1 into the 3D map 510. Also, as shown in FIG. 5S, the electronic device 500C uses the re-localization result RL_A4_B1 to merge the 3D map information from keyframes KF_A1-KF_A5 into the 3D map 570.

In some implementations, the electronic device 500A uses the re-localization result RL_C1_B3 to modify the 3D map information of the 3D map 510. In some implementations, the electronic device 500A ignores the re-localization result RL_C1_B3 in FIG. 5S. In some implementations, the electronic device 500C uses the re-localization result RL_B1_A4 to modify the 3D map information of the 3D map 570. In some implementations, the electronic device 500C optionally ignores the re-localization result RL_B1_A4 in FIG. 5S.

Figure 5T:
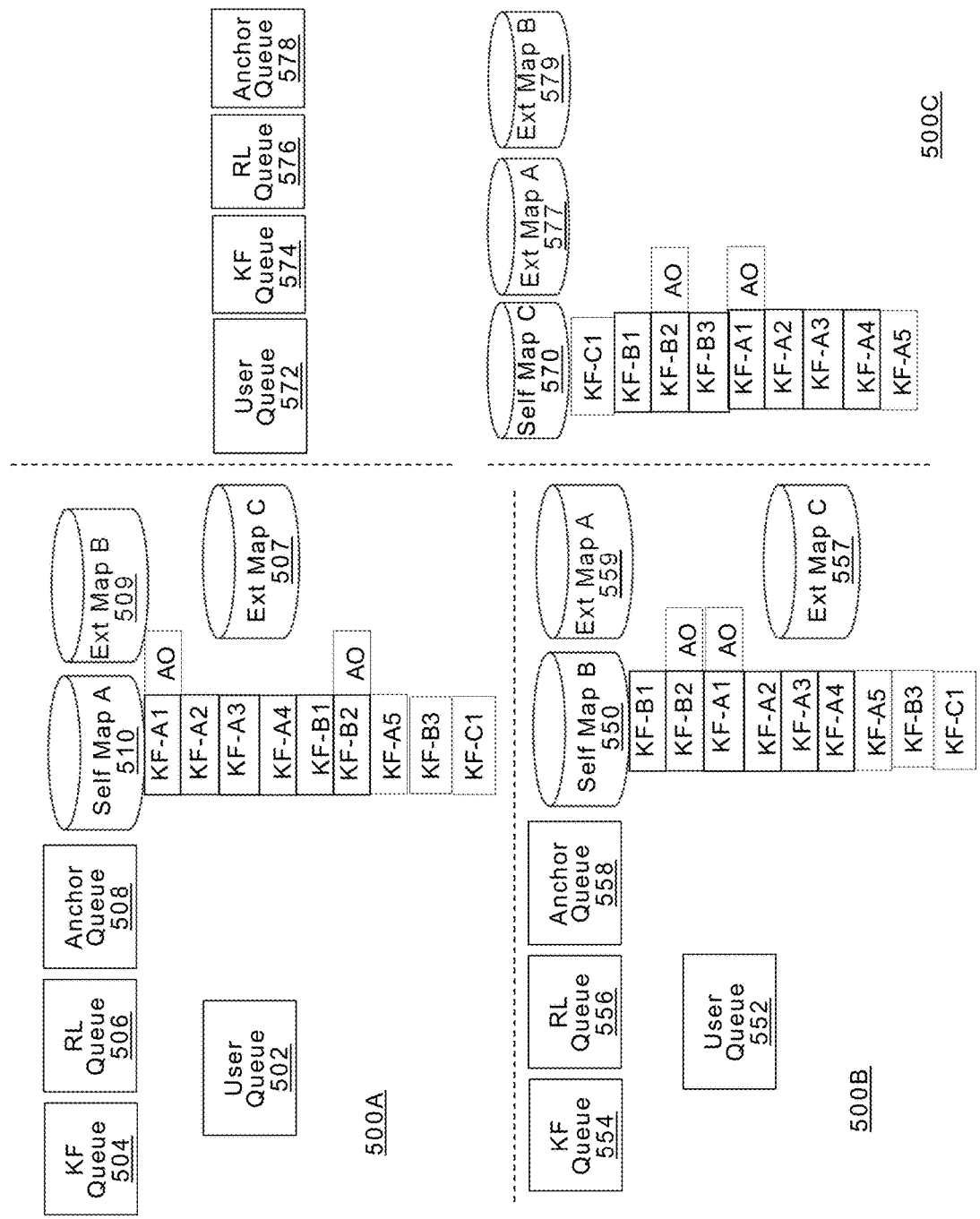
Figure 5U:
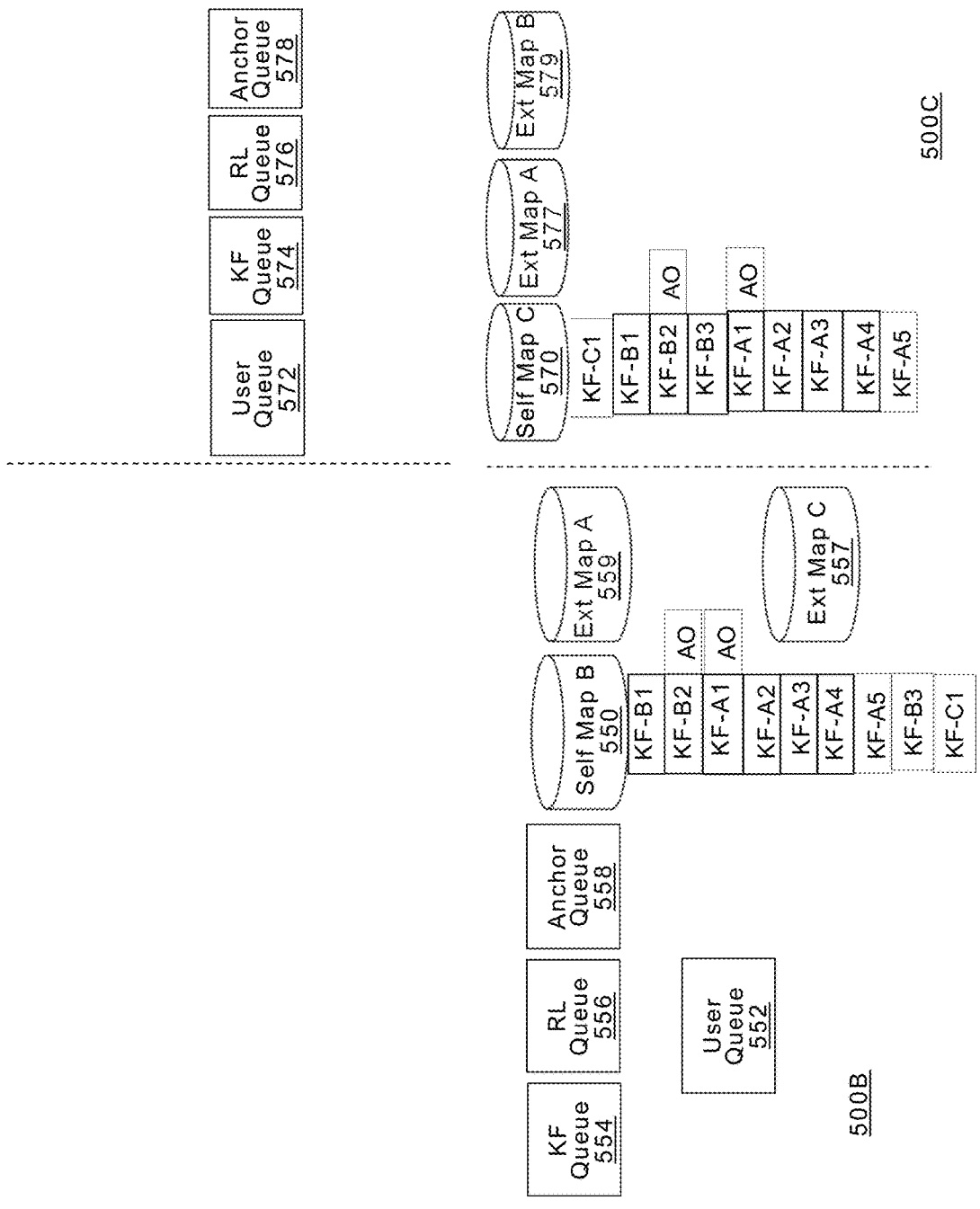

As shown in FIG. 5T, the electronic device 500A, the electronic device 500B, and the electronic device 500C have corresponding or "similar" 3D maps used for the respective CGR experience 505A, CGR experience 505B, and the CGR experience 505C. In some implementations, the 3D map 510 corresponds to the 3D map 550 and the 3D map 550 when each has the same amount of information (e.g., keyframes, pose graphs, sensor parameters, virtual objects, etc.) and each electronic device separately uses that information (e.g., in its SLAM optimizer) to estimate the keyframe poses in their individual 3D map. Corresponding 3D maps were described herein with respect to FIG. 5T according to some implementations.

As shown in FIG. 5U, the electronic device 500A leaves the shared multiuser CGR experience, and the electronic device 500B with the electronic device 500C continue the shared multiuser CGR experience.

Figure 6:
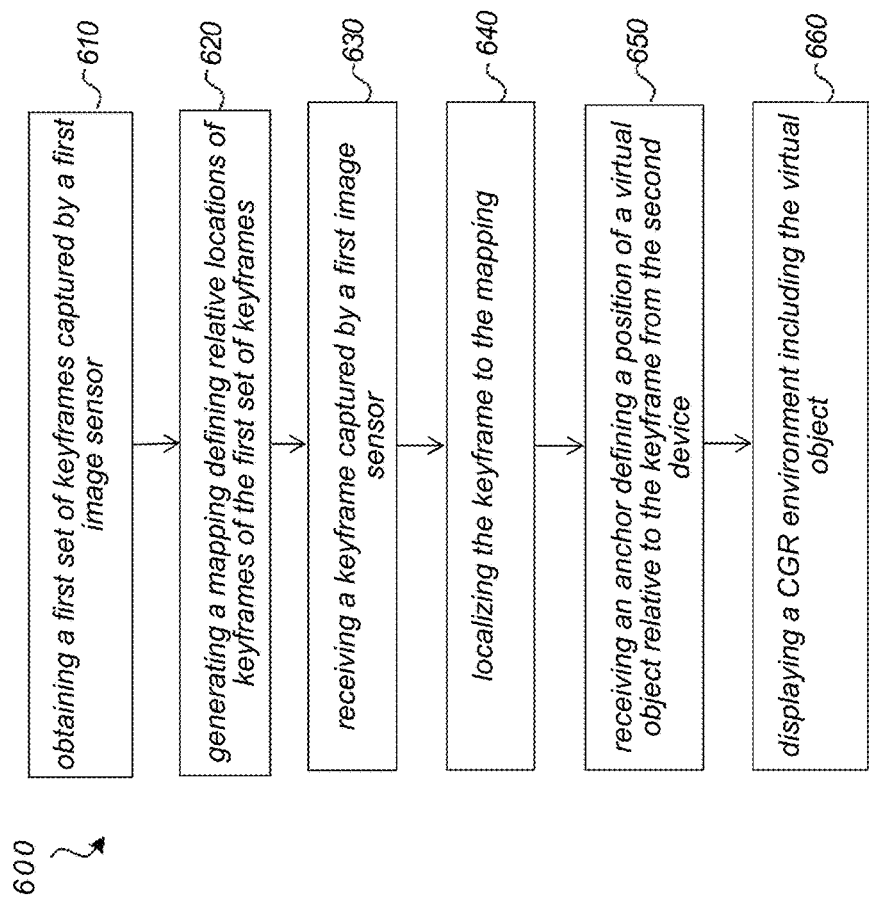
FIG. 6 is a flowchart representation of a method for virtual objects rendering in a CGR experience according to some implementations.

FIG. 6 is a flowchart representation of a method 600 for representing virtual objects in a CGR experience at a first user (e.g., between users in a shared multiuser CGR experience) from the perspective of a different originating user. In some implementations, the method 600 is performed by an electronic device (e.g., FIGS. 1-3). The method 600 can be performed at a mobile device, HMD, desktop, laptop, or server device. The method 600 can be performed on a head-mounted device that has a screen for displaying 2D images or screens for viewing stereoscopic images. In some implementations, the method 600 is performed by processing logic, including hardware, firmware, software, or a combination thereof. In some implementations, the method 600 is performed by a processor executing code stored in a non-transitory computer-readable medium (e.g., a memory).

At block 610, the method 600 obtains a first set of keyframes (e.g., 1 or more keyframes) based on images of a physical environment captured by a first image sensor (e.g., camera) of a first electronic device. In some implementations, the keyframes include information from additional sensors at the first electronic device. In some implementations, the keyframes include feature data defining locations of features with respect to a first pose of the first image sensor.

At block 620, the method 600 generates a mapping defining relative locations of keyframes of the first set of keyframes at the first electronic device. In some implementations, the mapping includes a pose graph. In some implementations, the mapping includes a 3D map of shared CGR environment in a 3D coordinate system.

At block 630, the method 600 receives a keyframe corresponding to an image of the physical environment captured by a second electronic device at the first electronic device. In some implementations, the first electronic device also receives additional information obtained by the second electronic device. In some implementations, the first electronic device also receives localization information, image sensor parameters, and depth sensor parameters associated with the second electronic device.

At block 640, the method 600 localizes the received keyframe to the mapping. In some implementations, the first electronic device localizes the received keyframe to the mapping based on determining or receiving relocalization data. In some implementations, the first electronic device localizes the received keyframe to the mapping by determining relative positions of the keyframe of the second electronic device to one or more keyframes of the set of keyframes from the first electronic device that are already part of the mapping. In some implementations, the first electronic device localizes the received keyframe to the mapping by determining relative positions of the keyframe of the second electronic device to an estimated pose of the first electronic device, using a first coordinate system at the first electronic device.

At block 650, the method 600 receives an anchor from the second electronic device at the first electronic device, where the anchor defines a position of a virtual object relative to the received keyframe. In some implementations, the anchor is associated with features in the received keyframe.

At block 660, the method 600 displays a CGR environment including the virtual object at a location based on the anchor and the mapping. In some implementations, the method 600 displays the CGR environment in a first 3D coordinate system at the first electronic device. In some implementations, the first electronic device displays the CGR environment on a display at the first electronic device.

In some implementations, a system includes a non-transitory computer-readable storage medium; and one or more processors coupled to the non-transitory computer-readable storage medium, wherein the non-transitory computer-readable storage medium includes program instructions that, when executed on the one or more processors, cause the system to perform operations including at a first electronic device having a first image sensor: obtaining a first set of keyframes based on images of a physical environment captured by the first image sensor; generating a mapping defining relative locations of keyframes of the first set of keyframes; receiving a keyframe corresponding to an image of the physical environment captured at a second electronic device; localizing the keyframe to the mapping; receiving an anchor from the second electronic device, the anchor defining a position of a virtual object relative to the keyframe; and displaying a CGR environment comprising the virtual object at a location based on the anchor and the mapping.

In some implementations, a system includes a non-transitory computer-readable storage medium; and one or more processors coupled to the non-transitory computer-readable storage medium, wherein the non-transitory computer-readable storage medium includes program instructions that, when executed on the one or more processors, cause the system to perform operations including at a first electronic device having a first image sensor: obtaining a first set of keyframes based on images of a physical environment captured by the first image sensor, the first set of keyframes defined in a first coordinate system; receiving a second set of keyframes corresponding to images of the physical environment captured at a second electronic device, the second set of keyframes defined in a second coordinate system different than the first coordinate system; generating a first mapping defining relative locations of keyframes of the first and second sets of keyframes in the first coordinate system; and at the second electronic device with a second image sensor: receiving the first set of keyframes corresponding to images of the physical environment captured at the first electronic device; and generating a second mapping defining relative locations of keyframes of the first and second sets of keyframes in the second coordinate system.

In some implementations, a non-transitory computer-readable storage medium stores program instructions computer-executable on a computer to perform operations including at a first electronic device having a first image sensor: obtaining a first set of keyframes based on images of a physical environment captured by the first image sensor; generating a mapping defining relative locations of keyframes of the first set of keyframes; receiving a keyframe corresponding to an image of the physical environment captured at a second electronic device; localizing the keyframe to the mapping; receiving an anchor from the second electronic device, the anchor defining a position of a virtual object relative to the keyframe; and displaying a CGR environment comprising the virtual object at a location based on the anchor and the mapping.

In some implementations, a non-transitory computer-readable storage medium stores program instructions computer-executable on a computer to perform operations including at a first electronic device having a first image sensor: obtaining a first set of keyframes based on images of a physical environment captured by the first image sensor, the first set of keyframes defined in a first coordinate system; receiving a second set of keyframes corresponding to images of the physical environment captured at a second electronic device, the second set of keyframes defined in a second coordinate system different than the first coordinate system; generating a first mapping defining relative locations of keyframes of the first and second sets of keyframes in the first coordinate system; and at the second electronic device with a second image sensor: receiving the first set of keyframes corresponding to images of the physical environment captured at the first electronic device; and generating a second mapping defining relative locations of keyframes of the first and second sets of keyframes in the second coordinate system.

Numerous specific details are set forth herein to provide a thorough understanding of the claimed subject matter. However, those skilled in the art will understand that the claimed subject matter may be practiced without these specific details. In other instances, methods apparatuses, or systems that would be by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the disclosure are to be understood as being in every respect illustrative and exemplary, but not restrictive, and the scope of the disclosure disclosed herein is not to be determined only from the detailed description of illustrative implementations but according to the full breadth permitted by patent laws. It is to be understood that the implementations shown and described herein are only illustrative of the principles of the present disclosure and that various modification may be implemented by those skilled in the art without departing from the scope and spirit of the disclosure.

What is claimed is:

1. A method, comprising:
   at a first electronic device having a first image sensor:
   capturing a first set of keyframes based on images of a physical environment captured by the first image sensor, the first set of keyframes defined in a first coordinate system;
   receiving a second set of keyframes corresponding to images of the physical environment captured by a second image sensor at a second electronic device, the second set of keyframes defined in a second coordinate system different than the first coordinate system;
   generating a first mapping defining relative locations of keyframes of the first and second sets of keyframes in the first coordinate system, wherein generating the first mapping comprises
      generating an internal mapping defining relative locations of the first set of keyframes in the first coordinate system;
      generating an external mapping defining relative locations of the second set of keyframes; and
      pairing one keyframe of the first set of keyframes and one keyframe of the second set of keyframes; and
   transmitting only the first set of keyframes.

2. The method of claim 1, wherein the first electronic device is participating in a multi-user computer generated reality (CGR) environment.

3. The method of claim 1, wherein generating the first mapping further comprises
   pairing the one keyframe of the first set of keyframes and the one keyframe of the second set of keyframes that include a set of matching features;
   determining first localization information from the paired keyframes; and
   merging the external mapping into internal mapping using the first localization information.

4. The method of claim 1, wherein keyframes comprise camera image data, additional sensor data, and a representation of a pose of the electronic device.

5. The method of claim 1, wherein keyframes comprise a representation of one or more features in the physical environment or a representation of a virtual object.

6. The method of claim 1, wherein the first mapping at the first electronic device includes a representation of re-localization information.

7. The method of claim 1, wherein the first mapping at the first electronic device includes additional sensor information or map registration data.

8. The method of claim 1, wherein the first electronic device is performing localization and mapping.

9. The method of claim 1, further comprising:
   at the first electronic device:
   displaying a computer generated reality (CGR) experience comprising a representation of a physical object in the physical environment and a virtual object based on the first mapping.

10. The method of claim 1, further comprising:
    at the first electronic device:
    receiving a second anchor from the second electronic device, the second anchor defining a position of a second virtual object relative to one keyframe of the second set of keyframes; and
    displaying a computer generated reality (CGR) experience comprising the second virtual object at a location based on the second anchor and the first mapping.

11. The method of claim 1, further comprising:
    at the first electronic device:
    receiving a third set of keyframes corresponding to images of the physical environment captured at a third electronic device, the third set of keyframes defined in a third coordinate system different than the first coordinate system; and
    modifying the first mapping by including relative locations of selected keyframes of the third set of keyframes in the first coordinate system.

12. The method of claim 1, further comprising:
    at the second electronic device with the second image sensor:
    receiving the first set of keyframes corresponding to images of the physical environment captured at the first electronic device;
    generating a second mapping defining relative locations of keyframes of the first and second sets of keyframes in the second coordinate system, wherein generating the second mapping comprises generating an internal mapping defining relative locations of the second set of keyframes in the second coordinate system; generating an external mapping defining relative locations of the first set of keyframes; and pairing a keyframe of the first set of keyframes and a keyframe of the second set of keyframes; and
    transmitting only the second set of keyframes.

13. The method of claim 12, further comprising:
    at the second electronic device:
    pairing the keyframe of the first set of keyframes and the keyframe of the second set of keyframes that include a set of matching features;
    determining second localization information from the paired keyframes; and
    merging the external mapping into the internal mapping using the second localization information.

14. The method of claim 12, further comprising:
    at the second electronic device:
    receiving a first anchor from the first electronic device, the first anchor defining a position of a first virtual object relative to one keyframe of the first set of keyframes; and
    displaying a computer generated reality (CGR) experience comprising the first virtual object at a location based on the first anchor and the second mapping, wherein the second electronic device is performing localization and mapping.

15. The method of claim 12, further comprising:
    at the second electronic device:
    receiving a third set of keyframes corresponding to images of the physical environment captured at a third electronic device, the third set of keyframes defined in a third coordinate system different than the second coordinate system;
    modifying the second mapping by including relative locations of selected keyframes of the third set of keyframes in the second coordinate system.

16. The method of claim 15, further comprising:
    at the third electronic device:
    receiving the first set of keyframes corresponding to images of the physical environment captured at the first electronic device;

receiving the second set of keyframes corresponding to images of the physical environment captured at the second electronic device; and generating a third mapping defining relative locations of keyframes of the first, the second, and the third sets of keyframes in the third coordinate system.

17. A system comprising:

a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising:

at a first electronic device having a first image sensor:

obtaining a first set of keyframes based on images of a physical environment captured by the first image sensor, the first set of keyframes defined in a first coordinate system;

receiving a second set of keyframes corresponding to images of the physical environment captured by a second image sensor at a second electronic device, the second set of keyframes defined in a second coordinate system different than the first coordinate system; and generating a first mapping defining relative locations of keyframes of the first and second sets of keyframes in the first coordinate system, wherein generating the first mapping comprises generating an internal mapping defining relative locations of the first set of keyframes in the first coordinate system;

generating an external mapping defining relative locations of the second set of keyframes; and pairing one keyframe of the first set of keyframes and one keyframe of the second set of keyframes; and transmitting only the first set of keyframes.

18. The system of claim 17, further comprising:

at the second electronic device with the second image sensor:

receiving the first set of keyframes corresponding to images of the physical environment captured at the first electronic device; and generating a second mapping defining relative locations of keyframes of the first and second sets of keyframes in the second coordinate system, wherein generating the second mapping comprises generating an internal mapping defining relative locations of the second set of keyframes in the second coordinate system;

generating an external mapping defining relative locations of the first set of keyframes; and pairing a keyframe of the first set of keyframes and a keyframe of the second set of keyframes.

19. A non-transitory computer-readable storage medium, storing program instructions computer-executable on a computer to perform operations comprising:

at a first electronic device having a first image sensor:

obtaining a first set of keyframes based on images of a physical environment captured by the first image sensor, the first set of keyframes defined in a first coordinate system;

receiving a second set of keyframes corresponding to images of the physical environment captured by a second image sensor at a second electronic device, the second set of keyframes defined in a second coordinate system different than the first coordinate system; and generating a first mapping defining relative locations of keyframes of the first and second sets of keyframes in the first coordinate system, wherein generating the first mapping comprises generating an internal mapping defining relative locations of the first set of keyframes in the first coordinate system;

generating an external mapping defining relative locations of the second set of keyframes; and pairing one keyframe of the first set of keyframes and one keyframe of the second set of keyframes; and transmitting only the first set of keyframes.

20. The non-transitory computer-readable storage medium, storing program instructions computer-executable on the computer to perform operations of claim 19, further comprising:

at the second electronic device with the second image sensor:

receiving the first set of keyframes corresponding to images of the physical environment captured at the first electronic device; and generating a second mapping defining relative locations of keyframes of the first and second sets of keyframes in the second coordinate system, wherein generating the second mapping comprises generating an internal mapping defining relative locations of the second set of keyframes in the second coordinate system; generating an external mapping defining relative locations of the first set of keyframes; and pairing a keyframe of the first set of keyframes and a keyframe of the second set of keyframes.

* * * * *